(12) United States Patent
Zheng et al.

(10) Patent No.: US 11,436,338 B2
(45) Date of Patent: Sep. 6, 2022

(54) BIOMETRIC RECOGNITION ATTACK TEST METHODS, APPARATUSES, AND DEVICES

(71) Applicant: ALIPAY (HANGZHOU) INFORMATION TECHNOLOGY CO., LTD., Zhejiang (CN)

(72) Inventors: Jianxu Zheng, Hangzhou (CN); Wenting Chang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,171

(22) Filed: Jun. 29, 2021

(65) Prior Publication Data
US 2022/0012343 A1   Jan. 13, 2022

(30) Foreign Application Priority Data

Jul. 13, 2020   (CN) .......................... 202010670689.4

(51) Int. Cl.
| | |
|---|---|
| *H04N 7/16* | (2011.01) |
| *G06F 7/04* | (2006.01) |
| *G06F 21/57* | (2013.01) |
| *G05B 19/045* | (2006.01) |
| *B25J 9/16* | (2006.01) |

(Continued)

(52) U.S. Cl.
CPC .......... *G06F 21/577* (2013.01); *B25J 9/1697* (2013.01); *B25J 13/08* (2013.01);
(Continued)

(58) Field of Classification Search
CPC ... G06F 21/577; G06F 2221/034; G06T 7/74; B25J 9/1697; B25J 13/08; B25J 9/1633;
(Continued)

(56) References Cited

U.S. PATENT DOCUMENTS

| | | | |
|---|---|---|---|
| 10,262,188 B2 | 4/2019 | Agassy et al. | |
| 2011/0138470 A1* | 6/2011 | Davis | G06F 21/564 |
| | | | 726/25 |

(Continued)

FOREIGN PATENT DOCUMENTS

| | | |
|---|---|---|
| CN | 105453524 | 3/2016 |
| CN | 106767995 | 5/2017 |

(Continued)

OTHER PUBLICATIONS

;ChenXing Zhao; Securing Handheld Devices and Fingerprint Readers with ECG Biometrics; IEEE;2017; pp. 150-155.*

(Continued)

*Primary Examiner* — Monjur Rahim
(74) *Attorney, Agent, or Firm* — Fish & Richardson P.C.

(57) ABSTRACT

Methods, systems, and apparatus for operations for performing a biometric recognition attack test on a biometric recognition device. An example method includes obtaining a biometric feature object for performing the biometric recognition attack on the biometric recognition device; Perform the biometric recognition attack test on the biometric recognition device, comprising: controlling a mechanical arm to place the biometric feature object in a recognition area of the biometric recognition device; and controlling the mechanical arm to press the biometric feature object to the biometric recognition device to trigger the biometric feature object to input the biometric features in the feature attachment part into the biometric recognition device through the conductive part; obtaining an attack test result corresponding to the biometric feature object; and determining a test result of the biometric recognition attack test performed on the biometric recognition device.

20 Claims, 6 Drawing Sheets

(51) Int. Cl.
  *B25J 13/08* (2006.01)
  *G01N 35/00* (2006.01)
  *G06T 7/73* (2017.01)
  *G06K 9/00* (2022.01)
(52) U.S. Cl.
  CPC ....... *G01N 35/0099* (2013.01); *G05B 19/045* (2013.01); *G06K 9/00013* (2013.01); *G06K 9/00067* (2013.01); *G06K 9/00885* (2013.01); *G06T 7/74* (2017.01); *B25J 9/1633* (2013.01); *G05B 2219/25252* (2013.01); *G05B 2219/25268* (2013.01); *G06F 2221/034* (2013.01)
(58) Field of Classification Search
  CPC ........... G01N 35/0099; G06K 9/00067; G06K 9/00885
  USPC .......................................................... 726/26
  See application file for complete search history.

(56) References Cited

U.S. PATENT DOCUMENTS

| | | | | | |
|---|---|---|---|---|---|
| 2011/0271053 | A1* | 11/2011 | Schroeter | ........... | G06K 19/0723 |
| | | | | | 711/115 |
| 2015/0242675 | A1* | 8/2015 | Pope | .................. | G06K 9/00073 |
| | | | | | 382/124 |
| 2017/0255198 | A1* | 9/2017 | Rodriguez | ........... | G05D 1/0088 |
| 2018/0322326 | A1* | 11/2018 | Li | ....................... | G06K 9/00053 |
| 2019/0050619 | A1* | 2/2019 | Kern | ...................... | G06K 9/036 |
| 2019/0318464 | A1* | 10/2019 | Chan | ...................... | G06T 7/001 |

FOREIGN PATENT DOCUMENTS

| CN | 107656162 | 2/2018 |
|---|---|---|
| CN | 107918327 | 4/2018 |
| CN | 210222160 | 3/2020 |
| WO | WO 2019075660 | 4/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

European Extended Search Report in European Application No. 21182260.6, dated Nov. 26, 2021, 9 pages.

* cited by examiner

| | |
|---|---|
| Biometric recognition attack test | |
| Information about a biometric recognition device (or user) to be tested | |
| Biometric recognition | fingerprint recognition ▽ |
| Test duration | |
| Test start time | |
| Quantity of biometric feature objects | |
| Test result | |

Confirm      Cancel

FIG. 2C

BIOMETRIC RECOGNITION ATTACK TEST METHODS, APPARATUSES, AND DEVICES

CROSS-REFERENCE TO RELATED APPLICATIONS

This application claims priority to Chinese Patent Application No. 202010670689.4, filed on Jul. 13, 2020, which is hereby incorporated by reference in its entirety.

TECHNICAL FIELD

The present specification relates to the field of computer technologies, and in particular, to biometric recognition attack test methods, apparatuses, and devices.

BACKGROUND

Biometric recognition (for example, fingerprint recognition and palmprint recognition) is usually implemented by using corresponding biometric recognition algorithms. There are many machine learning algorithms applied to the biometric recognition algorithms, and the machine learning algorithms yield more stochastic results.

A biometric recognition capability of a biometric recognition device usually can be manually tested. That is, a plurality of different test volunteers are called up, and then a biometric recognition test is performed on each of the test volunteers until all of the test volunteers complete the test, to obtain a test result. However, there are many machine learning algorithms applied to the biometric recognition algorithms, and the machine learning algorithms yield more stochastic results, and therefore a large quantity of attempts need to be made in the process of testing the biometric recognition capability of the biometric recognition device. Consequently, many human resources need to be consumed, there is a long test period, there are large error variances between manual operations in a manual test, and it is difficult to implement reproduction. Therefore, a better biometric recognition test solution needs to be provided, to more efficiently and accurately test biometric recognition.

SUMMARY

Embodiments of the present specification are intended to provide a better biometric recognition test solution, to more efficiently and accurately test biometric recognition.

To implement the previous technical solution, the embodiments of the present specification are implemented as follows:

Embodiments of the present specification provide a biometric recognition attack test method. The method includes the following: A biometric feature object needed for performing a biometric recognition attack on a biometric recognition device is obtained, where the biometric feature object includes a feature attachment part to which biometric features are attached and a conductive part; a mechanical arm is controlled to place the biometric feature object in a recognition area of the biometric recognition device, and the mechanical arm is controlled to press the biometric feature object to trigger the biometric feature object to input the biometric feature in the feature attachment part into the biometric recognition device through the conductive part, to perform a biometric recognition attack test; and an attack test result corresponding to the biometric feature object is obtained, and a test result of the biometric recognition attack performed on the biometric recognition device is determined based on the attack test result corresponding to the biometric feature object.

Embodiments of the present specification provide a biometric recognition attack test apparatus. The apparatus includes: an object acquisition module, configured to obtain a biometric feature object needed for performing a biometric recognition attack on a biometric recognition device, where the biometric feature object includes a feature attachment part to which biometric features are attached and a conductive part; an attack test module, configured to control a mechanical arm to place the biometric feature object in a recognition area of the biometric recognition device, and control the mechanical arm to press the biometric feature object to trigger the biometric feature object to input the biometric feature in the feature attachment part into the biometric recognition device through the conductive part, to perform a biometric recognition attack test; and a test result determining module, configured to obtain an attack test result corresponding to the biometric feature object, and determine, based on the attack test result corresponding to the biometric feature object, a test result of the biometric recognition attack performed on the biometric recognition device.

Embodiments of the present specification provide a biometric recognition attack test device. The biometric recognition attack test device includes: a processor; and a memory configured to store a computer-executable instruction. When the executable instruction is executed, the processor is enabled to perform the following operations: obtaining a biometric feature object needed for performing a biometric recognition attack on a biometric recognition device, where the biometric feature object includes a feature attachment part to which biometric features are attached and a conductive part; controlling a mechanical arm to place the biometric feature object in a recognition area of the biometric recognition device, and controlling the mechanical arm to press the biometric feature object to trigger the biometric feature object to input the biometric feature in the feature attachment part into the biometric recognition device through the conductive part, to perform a biometric recognition attack test; and obtaining an attack test result corresponding to the biometric feature object, and determining, based on the attack test result corresponding to the biometric feature object, a test result of the biometric recognition attack performed on the biometric recognition device.

Embodiments of the present specification further provide a storage medium. The storage medium is configured to store a computer-executable instruction. When the executable instruction is executed, the following procedures are implemented: obtaining a biometric feature object needed for performing a biometric recognition attack on a biometric recognition device, where the biometric feature object includes a feature attachment part to which biometric features are attached and a conductive part; controlling a mechanical arm to place the biometric feature object in a recognition area of the biometric recognition device, and controlling the mechanical arm to press the biometric feature object to trigger the biometric feature object to input the biometric feature in the feature attachment part into the biometric recognition device through the conductive part, to perform a biometric recognition attack test; and obtaining an attack test result corresponding to the biometric feature object, and determining, based on the attack test result corresponding to the biometric feature object, a test result of the biometric recognition attack performed on the biometric recognition device.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description are merely some of the embodiments described in the present specification. A person of ordinary skill in the art can further derive other drawings from these accompanying drawings without creative efforts.

FIG. 2C is a schematic structural diagram of a biometric recognition attack test interface, according to the present specification;

DETAILED DESCRIPTION OF EMBODIMENTS

The embodiments of the present specification provide biometric recognition attack test methods, apparatuses, and devices.

To make a person skilled in the art better understand the technical solutions in the present specification, the following clearly and comprehensively describes the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of the present specification.

Embodiment 1

Figure 1:
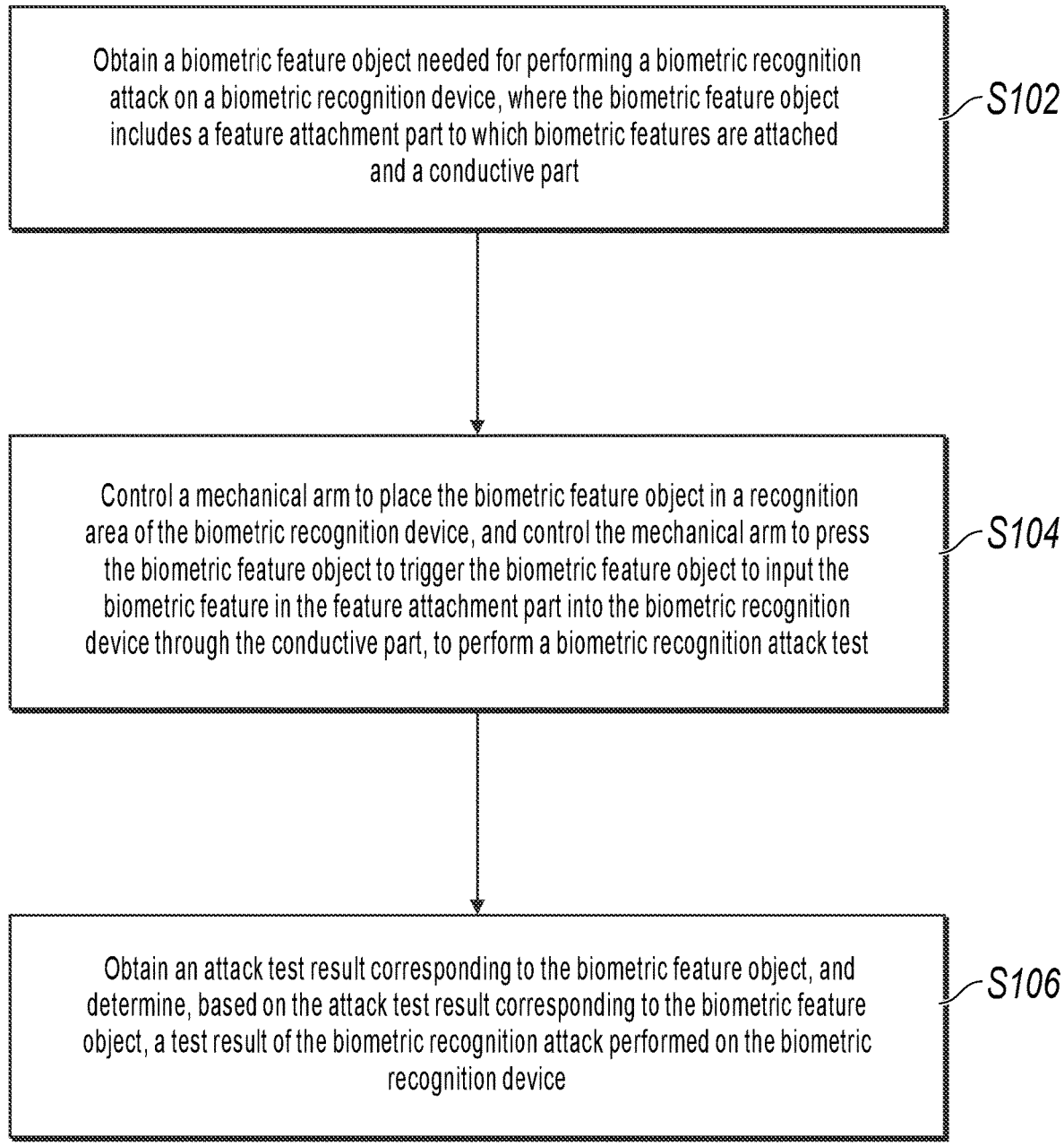
FIG. 1 is an embodiment illustrating a biometric recognition attack test method, according to the present specification.
Figure 2A:
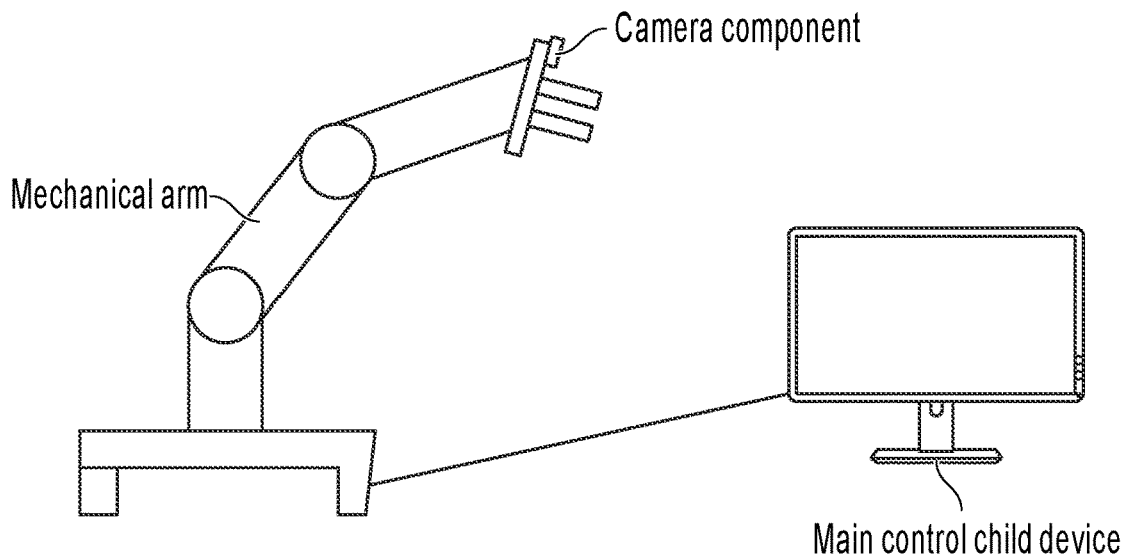
FIG. 2A is a schematic structural diagram of a biometric recognition test device, according to the present specification.

As shown in FIG. 1, the embodiments of the present specification provide a biometric recognition attack test method. The method can be performed by a biometric recognition test device. As shown in FIG. 2A, the test device can include a main control child device, a mechanical arm, etc. The main control child device can be a terminal device or a server. The server can be an independent server or a server cluster that includes a plurality of servers. The server can be a back-end server of a financial service, an online shopping service, etc., or can be a back-end server of a certain application program, etc. The terminal device can be a mobile terminal device such as a mobile phone or a tablet computer, or can be a device such as a personal computer. In the embodiments of the present specification, an example in which the main control child device is a terminal device is used for detailed description. For the case of the server, references can be made to the following related content. Details are omitted here for simplicity. The mechanical arm can be connected to the main control child device. The main control child device can send a control instruction to the mechanical arm. The mechanical arm can perform a corresponding operation based on the control instruction. A camera component (for example, a camera) can be disposed on the mechanical arm. The accuracy of the operation of the mechanical arm can be calibrated and fed back by using the camera component, and an object on which an operation is to be performed can be found and determined by using the camera component. The method can specifically include the following steps.

Step S102: Obtain a biometric feature object needed for performing a biometric recognition attack on a biometric recognition device, where the biometric feature object includes a feature attachment part to which biometric features are attached and a conductive part.

The biometric recognition device can be a device that can recognize one or more biometric features. For example, the biometric recognition device can be a fingerprint recognition device or a palmprint recognition device. The fingerprint recognition device can be a device such as an optical fingerprint sensor that obtains a fingerprint image by collecting an optical signal or a capacitive fingerprint sensor that obtains a fingerprint image by collecting a capacitive signal. The biometric recognition device can specifically include but is not limited to a personal computer, a mobile phone, a trading tool (for example, a vending machine), and various wearable devices (for example, a smart band or a smart watch), or can be another device in which the above sensor is disposed. The biometric recognition attack can be a process of recognizing a biometric feature of a user through a predetermined recognition method, and perform an attack on the process, to verify a recognition capability of the biometric recognition device. For example, an attack is performed on fingerprint recognition performed by the biometric recognition device, to verify a fingerprint recognition capability of the biometric recognition device. For another example, an attack is performed on palmprint recognition performed by the biometric recognition device, to verify a palmprint recognition capability of the biometric recognition device. The biometric recognition attack can be specifically set based on an actual situation. Implementations are not limited in the embodiments of the present specification. The biometric feature object can be a sample or a case object to be used for performing the attack test. There can be one or more biometric feature objects, and each biometric feature object can include a feature attachment part to which biometric features are attached, a conductive part, etc. The conductive part can include a part, made of a conductive material such as conductive ink or conductive silica gel, that can be used for performing a biometric feature test. The conductive part can play a conductive role. The feature attachment part can be a part for carrying biometric features or a part to which biometric features are attached.

In implementation, biometric recognition (for example, fingerprint recognition and palmprint recognition) is usually implemented by using corresponding biometric recognition algorithms. There are many machine learning algorithms applied to the biometric recognition algorithms, and the machine learning algorithms yield more stochastic results.

The biometric recognition capability of the biometric recognition device usually can be manually tested. That is, a plurality of different test volunteers are called up, and then a biometric recognition test is performed on each of the test volunteers until all of the test volunteers complete the test, to obtain a test result. However, there are many machine learning algorithms applied to the biometric recognition algorithms, and the machine learning algorithms yield more stochastic results, and therefore a large quantity of attempts need to be made in the process of testing the biometric recognition capability of the biometric recognition device. Consequently, many human resources need to be consumed, there is a long test period, there are large error variances between manual operations in a manual test, and it is difficult to implement reproduction. Therefore, a better biometric recognition test solution needs to be provided, to more efficiently and accurately test biometric recognition. Embodiments of the present specification provide an implementable technical solution, which can specifically include the following content:

To better perform a biometric recognition attack test, biometric feature images of different test volunteers can be separately collected. For example, for fingerprint recognition, images of a plurality of different fingers of each test volunteer and images of each finger in a plurality of different poses can be separately obtained, and a biometric feature object can be constructed based on the images of each finger in the plurality of different poses. Specifically, paper, a transparent film, etc. used to carry the images are not electrically conductive. When a biometric recognition attack is manually performed, because of conductivity of the finger, a touchscreen of the biometric recognition device can be triggered to perform biometric recognition. However, in the case of a mechanical arm, the touchscreen of the biometric recognition device cannot be triggered to perform biometric recognition. Therefore, corresponding materials can be selected for attaching the biometric feature image, and the selected material can be the feature attachment part. In addition, to enable biometric features in the images to be collected by the biometric recognition device, the conductive part can be disposed. By disposing the conductive part in the biometric feature object, some biometric feature objects that are not electrically conductive and can be only manually tested can be electrically conductive, thereby effectively avoiding phenomena of a long test period, a large test error, etc. in a manual detection process.

Figure 2B:
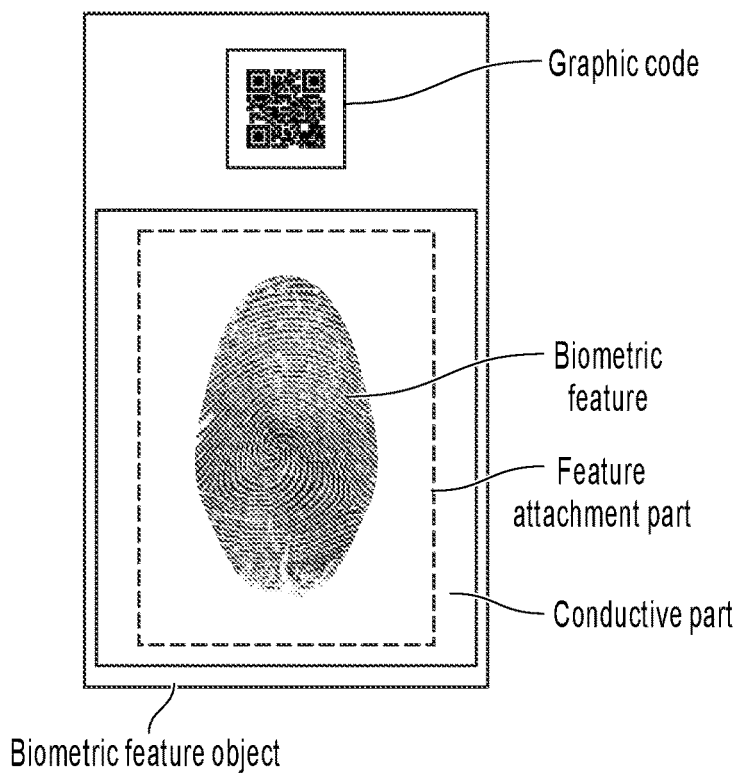
FIG. 2B is a schematic structural diagram of a biometric feature object, according to the present specification.

It is worthwhile to note that for the above parts and corresponding structures, the feature attachment part and the conductive part be combined (for example, glued together), so that the feature attachment part and the conductive part are combined as a whole to obtain the biometric feature object. In addition, for the above parts and corresponding structures, a substrate can be further disposed. The substrate can combine the feature attachment part and the conductive part as a whole, to obtain the corresponding biometric feature object (as shown in FIG. 2B). The biometric feature object constructed by using the above method can be added to a biometric feature library for storage.

To improve test efficiency, a test interface can be developed in advance by using a corresponding programming language based on processing mechanisms of biometric recognition and a biometric recognition attack test. As shown in FIG. 2C, the test interface can include an input box of information about a biometric recognition device (or user) to be tested, a biometric recognition selection box, test duration, a test start time, a quantity of biometric feature objects, a test result output box, a confirm button, a cancel button, etc. When a biometric recognition attack needs to be performed on a certain biometric recognition device, a tester can determine the biometric recognition device (or corresponding user), and then can obtain related information of the biometric recognition device (or corresponding user), for example, an image or a fingerprint image of the user. The obtained related information can be input into the input box of the information about the biometric recognition device (or user). After the input is completed, the tester can further select, by using the biometric recognition selection box based on an actual situation, a biometric recognition process to be performed, and can set the test duration, the test start time, the quantity of test objects, etc. After the setting is completed, the tester can start a test process, that is, the tester can click the confirm button on the interface. In this case, the test device can obtain the related information of the biometric recognition device to be tested from the input box of the information about the biometric recognition device (or the user), and can further obtain a biometric recognition test type, the test duration, the test start time, the quantity of biometric feature objects, etc. The related information of the biometric recognition device and the other obtained information can be analyzed, to determine a biometric feature object needed for performing a biometric recognition attack on the biometric recognition device.

For example, fingerprint recognition is selected in the biometric recognition selection box, the test start time is a current moment, the test duration and the quantity of test objects do not have to be limited, and the information about the biometric recognition device to be tested can be an identifier such as a name of the biometric recognition device. In this case, the biometric feature object needed for performing the biometric recognition attack on the biometric recognition device can be obtained based on the identifier of the biometric recognition device (or corresponding user).

Step S104: Control the mechanical arm to place the biometric feature object in a recognition area of the biometric recognition device, and control the mechanical arm to press the biometric feature object to trigger the biometric feature object to input the biometric feature in the feature attachment part into the biometric recognition device through the conductive part, to perform a biometric recognition attack test.

The recognition area can be an area in which a biometric feature can be effectively recognized in a process of performing biometric recognition by the biometric recognition device. Fingerprint recognition is used as an example. In this case, an area of the biometric recognition device in which fingerprint data is input can be used as the recognition area. Specifically, the recognition area can be set based on an actual situation. Implementations are not limited in the embodiments of the present specification.

In implementation, after determining the biometric feature object needed for performing the biometric recognition attack on the biometric recognition device, the main control child device in the test device can analyze the obtained biometric feature object, to determine a quantity of included biometric feature objects, and detect current position information of the biometric recognition device, and then can send the position information of the biometric feature object to the mechanical arm. The mechanical arm can identify a position of the biometric feature object by using the camera component based on the position information of the biometric feature object, and then the mechanical arm can move to the identified position to pick up the biometric feature object. If there are a plurality of biometric feature objects, the mechanical arm can pick up each biometric feature object, etc. based on a position of the biometric feature object. After the mechanical arm picks up the corresponding biometric feature object, the tester can place or affix the biometric recognition device in a designated position, or the main control child device can send an instruction of setting the biometric recognition device to the mechanical arm. The mechanical arm can identify the biometric recognition device by using the camera component, and then can pick up the biometric recognition device, and place or affix the biometric recognition device in the designated position.

The main control child device can determine the recognition area of the biometric recognition device, and afterwards, can control the mechanical arm to place the biometric feature object in the recognition area of the biometric recognition device. In this case, although the biometric feature object is placed in the recognition area of the biometric recognition device, if the biometric feature object is not in sufficient contact with the recognition area, the biometric feature object cannot trigger the biometric recognition device to perform biometric recognition. Based on this, the main control child device can send a control instruction to the mechanical arm to control the mechanical arm to press the biometric feature object. By pressing the biometric feature object, the conductive part in the biometric feature object can trigger the biometric recognition device to perform biometric recognition. In this case, the biometric feature object inputs the biometric feature in the feature attachment part into the biometric recognition device through the conductive part. The biometric recognition device can recognize the biometric feature input by the biometric feature object to obtain a corresponding recognition result.

It is worthwhile to note that the main control child device can further control the mechanical arm to adjust a position and pose of the biometric feature object, so that the biometric feature object can be in a plurality of different positions and poses. The plurality of different positions and poses can be determined based on a plurality of different dimensions, for example, a two-dimensional position and pose, a three-dimensional position and pose, or a five-dimensional position and pose. The position and pose can be specifically set based on an actual situation. Implementations are not limited in the embodiments of the present specification. For each position and pose, the biometric recognition device can start a biometric recognition sensor of the biometric recognition device to collect the biometric feature in the biometric feature object in the recognition area, and can record the recognition result at the same time.

Step S106: Obtain an attack test result corresponding to the biometric feature object, and determine, based on the attack test result corresponding to the biometric feature object, a test result of the biometric recognition attack performed on the biometric recognition device.

The test result of the biometric recognition attack performed on the biometric recognition device can include an attack success rate, biometric recognition accuracy, etc. The test result can be specifically set based on an actual situation. Implementations are not limited in the embodiments of the present specification.

In implementation, the attack test result corresponding to the biometric feature object can be obtained from the biometric recognition device, the attack test result corresponding to the biometric feature object (which can include a test result corresponding to the biometric feature object in each position and pose) can be statistically analyzed, to determine a quantity of test results indicating an attack success and a quantity of test results indicating an attack failure, and then the test result of the biometric recognition attack performed on the biometric recognition device can be determined based on a statistical analysis result. For example, there are 30 biometric feature objects, test results of biometric recognition attacks performed by the test device by controlling the mechanical arm indicate an attack failure for 29 biometric feature objects, and a test result of a biometric recognition attack indicates an attack success for the remaining one biometric feature object. In this case, the test result of the biometric recognition attack performed on the biometric recognition device can include the attack success rate of $1/30=3.3\%$, the biometric recognition accuracy of 96.7%, etc.

The embodiments of the present specification provide the biometric recognition attack test method. The biometric feature object needed for performing the biometric recognition attack on the biometric recognition device is obtained, where the biometric feature object includes the feature attachment part to which biometric features are attached and the conductive part; and the mechanical arm is controlled to place the biometric feature object in the recognition area of the biometric recognition device. In this case, the biometric recognition attack test is performed on the biometric recognition device by using the mechanical arm, and therefore human resources are saved. In addition, various parameters (for example, a distance) of the mechanical arm are within a controllable range, thereby reducing an objective error in a manual test. In addition, the mechanical arm can be further controlled to press the biometric feature object to trigger the biometric feature object to input the biometric feature in the feature attachment part into the biometric recognition device through the conductive part, to perform the biometric recognition attack test; and the attack test result corresponding to the biometric feature object is obtained, and the test result of the biometric recognition attack performed on the biometric recognition device is determined based on the attack test result corresponding to the biometric feature object. In this case, the test is controlled by using the mechanical arm, and therefore test efficiency and test accuracy are improved.

Embodiment 2

Figure 3:
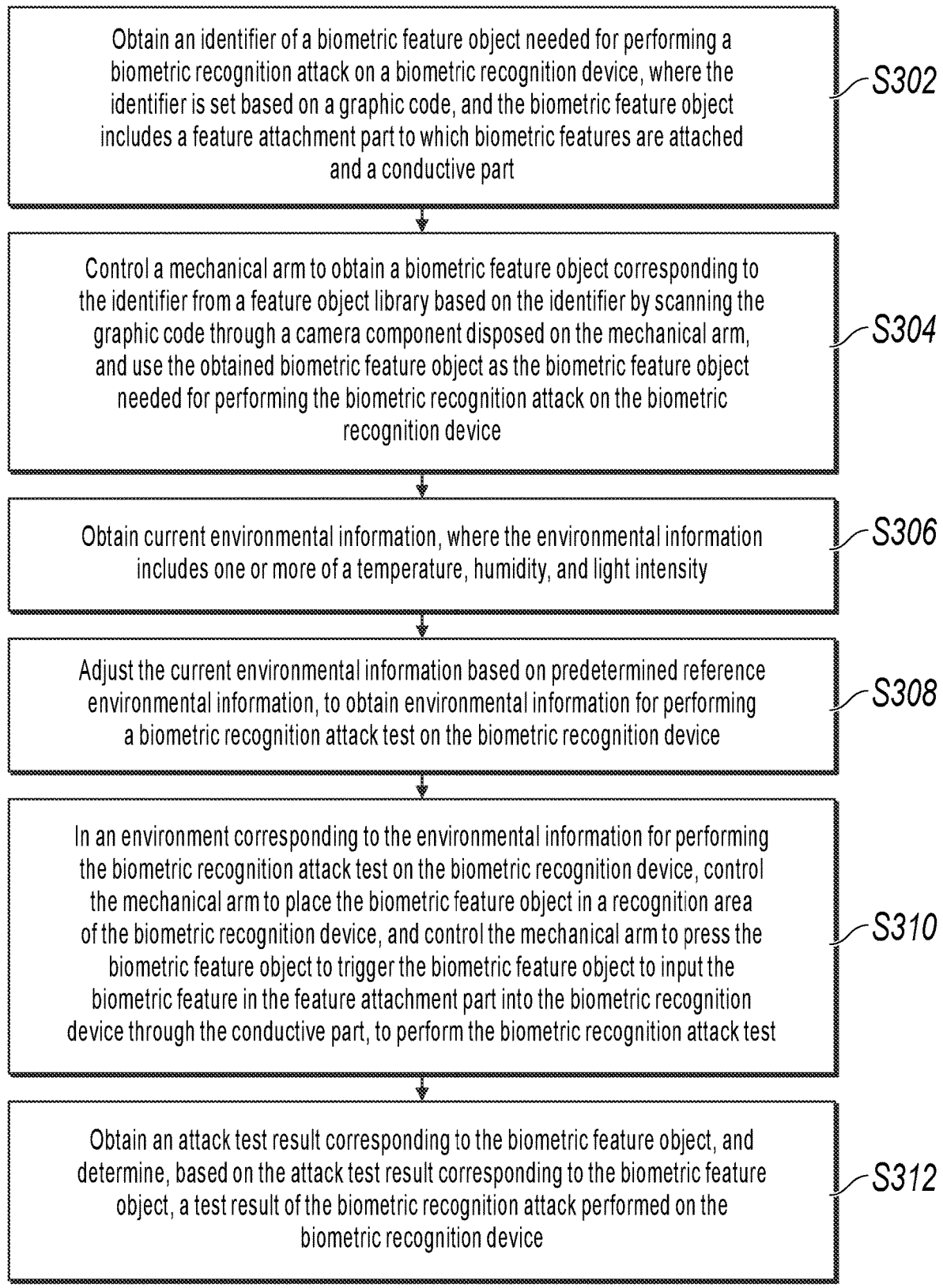
FIG. 3 is an embodiment illustrating another biometric recognition attack test method, according to the present specification.

As shown in FIG. 3, the embodiments of the present specification provide a biometric recognition attack test method. The method can be performed by a biometric recognition test device. As shown in FIG. 2A, the test device can include a main control child device, a mechanical arm, etc. The main control child device can be a terminal device or a server. The server can be an independent server or a server cluster that includes a plurality of servers. The server can be a back-end server of a financial service, an online shopping service, etc., or can be a back-end server of a certain application program, etc. The terminal device can be a mobile terminal device such as a mobile phone or a tablet computer, or can be a device such as a personal computer. In the embodiments of the present specification, an example in which the main control child device is a terminal device is used for detailed description. For the case of the server, references can be made to the following related content. Details are omitted here for simplicity. The mechanical arm can be connected to the main control child device. The main control child device can send a control instruction to the mechanical arm. The mechanical arm can perform a corresponding operation based on the control instruction. A camera component (for example, a camera) can be disposed on the mechanical arm. The accuracy of the operation of the mechanical arm can be calibrated and fed back by using the camera component, and an object on which an operation is to be performed can be determined by using the camera component. The method can specifically include the following steps.

Step S302: Obtain an identifier of a biometric feature object needed for performing a biometric recognition attack on a biometric recognition device, where the identifier is set based on a graphic code, and the biometric feature object includes a feature attachment part to which biometric features are attached and a conductive part.

The biometric feature can include at least a fingerprint, a palmprint, etc. The identifier of the biometric feature object can be used to represent information about an identity of the biometric feature object. The identifier of the biometric feature object can be a name, a code, etc. of the biometric feature object. The graphic code can be a barcode, a two-dimensional code, etc.

In implementation, an identifier can be set for each biometric feature object, a corresponding graphic code (for example, a barcode or a two-dimensional code) can be generated by using the identifier, and the generated graphic code can be correspondingly stored with the biometric feature object. Specifically, the generated graphic code can be set on the biometric feature object (for example, the generated graphic code is attached on the biometric feature object). The test device can obtain information about the biometric recognition device to be tested, and can further obtain a biometric recognition test type, test duration, a test start time, a quantity of biometric feature objects, etc. The related information of the biometric recognition device and the other obtained information can be analyzed, to determine the biometric feature object needed for performing the biometric recognition attack on the biometric recognition device, and the identifier of the determined biometric feature object can be obtained.

Step S304: Control the mechanical arm to obtain a biometric feature object corresponding to the identifier from a feature object library based on the identifier by scanning the graphic code through the camera component disposed on the mechanical arm, and use the obtained biometric feature object as the biometric feature object needed for performing the biometric recognition attack on the biometric recognition device.

The feature object library can be an area for storing different biometric feature objects, a database for storing information about the biometric feature object, etc.

In implementation, when a certain biometric feature object needs to be found or obtained, the camera component disposed on the mechanical arm can be started, a graphic code set on each biometric feature object can be scanned by using the camera component, and an identifier of the biometric feature object corresponding to the graphic code can be determined by analyzing the scanned graphic code. The determined identifier of the biometric feature object can be compared with the obtained identifier of the biometric feature object needed for performing the biometric recognition attack on the biometric recognition device. If the determined identifier of the biometric feature object matches the obtained identifier of the biometric feature object needed for performing the biometric recognition attack on the biometric recognition device, the determined identifier of the biometric feature object can be determined as the identifier of the biometric feature object needed for performing the biometric recognition attack on the biometric recognition device. In this case, the mechanical arm can be controlled to obtain the biometric feature object corresponding to the identifier from the feature object library, and the obtained biometric feature object can be used as the biometric feature object needed for performing the biometric recognition attack on the biometric recognition device. If the determined identifier of the biometric feature object does not match the obtained identifier of the biometric feature object needed for performing the biometric recognition attack on the biometric recognition device, a graphic code of a next biometric feature object can be obtained by using the above method to perform the above processing process, until the biometric feature object needed for performing the biometric recognition attack on the biometric recognition device is obtained.

It is worthwhile to note that the above implementation is merely an optional implementation, and there can be a plurality of different implementations in practice. Implementations can be specifically set based on an actual situation.

Step S306: Obtain current environmental information, where the environmental information includes one or more of a temperature, humidity, and light intensity.

In addition to the above information, the environmental information can include other related information. The environmental information can be specifically set based on an actual situation.

In implementation, a temperature sensor, a humidity sensor, a light intensity sensor, etc. can be further disposed in the test device. The current temperature, the humidity, and the light intensity can be respectively obtained by the sensors. In other words, the current temperature can be detected by the temperature sensor, the current humidity can be detected by the humidity sensor, and the current light intensity can be detected by the light intensity sensor. The temperature, the humidity, the light intensity, etc. detected by the sensors can be provided for the test device, so that the test device can obtain the current environmental information.

Step S308: Adjust the current environmental information based on predetermined reference environmental information, to obtain environmental information for performing a biometric recognition attack test on the biometric recognition device.

The reference environmental information can be predetermined standard environmental information, and the reference environmental information can vary with the biometric recognition attack test. For example, a fingerprint recognition attack test and a palmprint recognition attack test can correspond to different reference environmental information.

In implementation, a different environment exerts certain impact on biometric recognition, for example, a different temperature exerts impact on sensitivity of a fingerprint recognition component. Specifically, if an environmental temperature is lower than a predetermined temperature threshold, the sensitivity of the fingerprint recognition component is obviously reduced. To eliminate a case in which different biometric recognition attack test results are obtained due to changes in the environment, uniform environmental information (namely, reference environmental information) can be predetermined. The reference environmental information can be environmental information corresponding to an environment in which least impact is exerted on a biometric recognition component or the biometric recognition component has the best stability, etc. The reference environmental information can be specifically set based on an actual situation.

After the reference environmental information is set by using the above method, when the current environmental information is obtained, the current environmental information can be adjusted by using the reference environmental information, so that the current environmental information matches the reference environmental information. For example, the reference environmental information can include a temperature range of 10□-25□, and the current environmental information can include a temperature of −10□. In this case, the current temperature can be adjusted, so that a value of the temperature falls within the range of 10□-25□. Finally, the environmental information for performing the biometric recognition attack test can be obtained. Subsequent processing can be performed based on the environmental information. That is, the environmental information for performing the biometric recognition attack test can be stabilized, and therefore a case in which different biometric recognition attack test results are obtained due to changes in the environment is eliminated.

Step S310: In an environment corresponding to the environmental information for performing the biometric recognition attack test on the biometric recognition device, control the mechanical arm to place the biometric feature object in the recognition area of the biometric recognition device, and control the mechanical arm to press the biometric feature object to trigger the biometric feature object to input the biometric feature in the feature attachment part into the biometric recognition device through the conductive part, to perform the biometric recognition attack test.

In implementation, in the environment corresponding to the environmental information for performing the biometric recognition attack test on the biometric recognition device, the mechanical arm can be controlled to place the biometric feature object in the recognition area of the biometric recognition device, and the mechanical arm can be controlled to press the biometric feature object to trigger the biometric feature object to input the biometric feature in the feature attachment part into the biometric recognition device through the conductive part, to perform the biometric recognition attack test. For a specific processing process of step S310 of controlling the mechanical arm to place the biometric feature object in the recognition area of the biometric recognition device, and controlling the mechanical arm to press the biometric feature object to trigger the biometric feature object to input the biometric feature in the feature attachment part into the biometric recognition device through the conductive part, to perform the biometric recognition attack test, references can be made to the specific processing process of step S104 in Embodiment 1. Details are omitted here for simplicity.

In addition, the specific processing process of step S310 does not have to be limited to the specific processing process of step S104 in Embodiment 1, and can be implemented by using plurality of other different methods. Specific processing of controlling the mechanical arm to press the biometric feature object in step 310 can be implemented by using a plurality of different methods. An optional processing method is provided below, and can specifically include the following content: The mechanical arm is controlled to press the biometric feature object based on a predetermined pressure parameter. The pressure parameter includes a pressure force parameter and a pressure angle parameter used by the mechanical arm to press the biometric feature object.

In implementation, reference values corresponding to the pressure force parameter and the pressure angle parameter used by the mechanical arm to press the biometric feature object can be set based on an actual situation, and the pressure parameter for pressing the biometric feature object can be set based on the determined reference values corresponding to the pressure force parameter and the pressure angle parameter. When the mechanical arm needs to be controlled to simulate a finger or palm to input the biometric feature into the biometric recognition device, the determined pressure parameter can be provided for the mechanical arm, and the mechanical arm can press the biometric feature object by using the obtained pressure parameter. The biometric feature in the biometric feature object is input into the biometric recognition device by setting the same pressure parameter, and therefore consistency of input variables of biometric feature objects can be ensured when the biometric feature objects perform the biometric recognition attack test, to improve accuracy of the attack test performed on the biometric recognition device, and accuracy can also be ensured when test results corresponding to the plurality of biometric feature objects are compared.

In addition, a specific processing process of controlling the mechanical arm to place the biometric feature object in the recognition area of the biometric recognition device in step S310 can be implemented by using a plurality of different methods. Three optional processing methods are provided below, and can specifically include the following methods 1 to 3.

Method 1: The mechanical arm is controlled, by using the camera component and a predetermined image recognition algorithm, to place the biometric feature object in the recognition area of the biometric recognition device. For specific processing, references can be made to processing of the following step A2 to step A6.

Step A2: Obtain a first image that includes the recognition area of the biometric recognition device and a second image that includes the biometric feature object through the camera component disposed on the mechanical arm.

In implementation, the camera component (for example, a camera) can be disposed on the mechanical arm, the camera component disposed on the mechanical arm can be started, and the first image that includes the recognition area of the biometric recognition device and a predetermined reference position can be captured. Similarly, the second image that includes the biometric feature object and the predetermined reference position can be captured.

Step A4: Separately determine position information of the recognition area relative to the predetermined reference position and position information of the biometric feature object relative to the predetermined reference position based on the obtained first image, the obtained second image, and the predetermined image recognition algorithm.

The position information of the recognition area relative to the predetermined reference position can be two-dimensional position information, three-dimensional position information, geographical location information, etc. The position information of the recognition area relative to the predetermined reference position can be specifically set based on an actual situation.

In implementation, the first image and the second image can be separately analyzed by using the predetermined image recognition algorithm, to determine related information such as a shape and a size of the recognition area and related information such as a shape and a size of the biometric feature object, and to further determine the position information of the recognition area relative to the predetermined reference position and the position information of the biometric feature object relative to the predetermined reference position. In a process of capturing the first image and the second image by the camera component disposed on the mechanical arm, different objects (including the recognition area of the biometric recognition device, the biometric feature object, the predetermined reference position, etc.) in the first image and the second image can be marked by different colors or other marking methods, and the predetermined reference position, the recognition area, and a distance between the predetermined reference position and the biometric feature object can be marked by using different colors or other marking methods. For example, two-dimensional axis information can be marked by using a special color range. For example, the two-dimensional axis information can be indicated by using a white bounding box or a black bounding box, a position of the biometric feature object can be indicated by using a green bounding box, a position of the biometric feature in the biometric feature object can be indicated by using a red bounding box, a position of the recognition area of the biometric recognition device can be indicated by using a blue bounding box, and a position of the graphic code in the biometric feature object can be indicated by using a yellow bounding box. This can be specifically set based on an actual situation. Implementations are not limited in the embodiments of the present specification. As such, three-dimensional positions of the recognition area of the biometric recognition device and the biometric feature object can be completely identified by using a combination of two-dimensional images and colors, so that a movement trajectory can be planned for the mechanical arm, and the recognition area of the biometric recognition device and the biometric feature object can be accurately located.

Step A6: Control the mechanical arm to place the biometric feature object in the recognition area of the biometric recognition device based on the position information of the recognition area relative to the predetermined reference position and the position information of the biometric feature object relative to the predetermined reference position.

In implementation, after the position information of the recognition area relative to the predetermined reference position and the position information of the biometric feature object relative to the predetermined reference position are obtained by using the above method, the movement trajectory of the mechanical arm can be planned based on the position information. The planned movement trajectory then can be provided for the mechanical arm, and the mechanical arm can pick up the biometric feature object, and place the biometric feature object in the recognition area of the biometric recognition device.

Method 2: The biometric feature object further includes a positioning part, and the mechanical arm is controlled to place the biometric feature object in the recognition area of the biometric recognition device by using the positioning part. For specific processing, references can be made to processing of the following step B2 to step B8.

Step B2: Send a positioning signal to each of the positioning part of the biometric feature object and the biometric recognition device.

The biometric recognition device can also include a positioning part, and the positioning part can be a positioning part of a predetermined positioning system (for example, a positioning part of a GPS or a positioning part of a Beidou navigation satellite system), can be a positioning part implemented based on a millimeter wave, Wi-Fi, Bluetooth, NFC, etc., or can be specifically set based on an actual situation. Implementations are not limited in the embodiments of the present specification. The positioning signal can include, for example, an identifier of the test device, a current time, the positioning part of the biometric feature object, and an identifier of the biometric recognition device, or can be specifically set based on an actual situation. Implementations are not limited in the embodiments of the present specification.

Step B4: Receive a response signal, corresponding to the positioning signal, returned by each of the positioning part of the biometric feature object and the biometric recognition device.

The response signal can include, for example, the identifier of the test device, a time of sending the response signal, the positioning part of the biometric feature object, and the identifier of the biometric recognition device, or can be specifically set based on an actual situation. Implementations are not limited in the embodiments of the present specification.

Step B6: Separately determine position information of the recognition area relative to a predetermined reference position and position information of the biometric feature object relative to the predetermined reference position based on related information corresponding to the positioning signal and the response signal.

In implementation, the test device can calculate a relative distance between the recognition area and the predetermined reference position and a relative distance between the biometric feature object and the predetermined reference position based on the related information corresponding to the positioning signal and the response signal (for example, the current time in the positioning signal and the time of sending the response signal in the response signal), a signal propagation speed, etc., and can further determine the position information of the recognition area relative to the predetermined reference position and the position information of the biometric feature object relative to the predetermined reference position.

Step B8: Control the mechanical arm to place the biometric feature object in the recognition area of the biometric recognition device based on the position information of the recognition area relative to the predetermined reference position and the position information of the biometric feature object relative to the predetermined reference position.

For a specific processing process of step B8, references can be made to the specific processing process of step A6 in method 1. Details are omitted here for simplicity.

Method 3: The mechanical arm is controlled to place the biometric feature object in the recognition area of the biometric recognition device based on a plurality of position adjustments by using the camera component and a predetermined image recognition algorithm. For specific processing, references can be made to processing of the following step C2 and step C4.

Step C2: Control the mechanical arm to place the biometric feature object in a preselected area, where the preselected area is an area that includes or is adjacent to the recognition area of the biometric recognition device.

In implementation, the mechanical arm can be controlled to dynamically and randomly place the biometric feature object in the area that includes the recognition area of the biometric recognition device, or the mechanical arm can be controlled to dynamically and randomly place the biometric feature object in the adjacent area of the recognition area, to reduce processing pressure of the test device at a certain time point.

Step C4: Control the mechanical arm to place the biometric feature object in the recognition area of the biometric recognition device by moving the biometric feature object towards the recognition area at least once based on the camera component disposed on the mechanical arm and the predetermined image recognition algorithm.

In implementation, the camera component disposed on the mechanical arm can be started to capture an image that includes the recognition area of the biometric recognition device and the biometric feature object, and the captured image can be analyzed by using the predetermined image recognition algorithm to determine whether the biometric feature object is placed in the recognition area of the biometric recognition device. If it is determined that the biometric feature object is not placed in the recognition area of the biometric recognition device, the test device can control the mechanical arm to move the biometric feature object towards the recognition area of the biometric recognition device at a predetermined step distance (for example, 1 cm or 5 mm). Then, the camera component disposed on the mechanical arm can be started again to capture an image that includes the recognition area of the biometric recognition device and the biometric feature object, and the captured image can be analyzed by using the predetermined image recognition algorithm to determine whether the biometric feature object is placed in the recognition area of the biometric recognition device. If it is determined that the biometric feature object is placed in the recognition area of the biometric recognition device, subsequent processing can be continued. If it is determined that the biometric feature object is not placed in the recognition area of the biometric recognition device, the test device can control the mechanical arm to continue to move the biometric feature object towards the recognition area of the biometric recognition device at the predetermined step distance. The processing then can be repeated, until the biometric feature object is placed in the recognition area of the biometric recognition device.

A specific processing process of step C4 can be implemented by using a plurality of different methods. One optional processing method is provided below, and can specifically include processing in the following steps C42 to C46.

Step C42: Obtain the image that includes the biometric feature object and the recognition area through the camera component disposed on the mechanical arm.

Step C44: Determine positional relationship information between the biometric feature object and the recognition area by using the predetermined image recognition algorithm based on the obtained image that includes the biometric feature object and the recognition area.

The positional relationship information between the biometric feature object and the recognition area can include, for example, a relative distance range between the biometric feature object and the recognition area and information indicating whether the biometric feature object is located in the recognition area. The positional relationship information can be specifically set based on an actual situation. Implementations are not limited in the embodiments of the present specification.

Step C46: Determine, based on the determined positional relationship information, a distance at which the biometric feature object moves towards the recognition area, and control the mechanical arm to move the biometric feature object towards the recognition area based on the determined distance.

In implementation, the distance at which the biometric feature object moves towards the recognition area can be determined based on the relative distance range, between the biometric feature object and the recognition area, in the determined positional relationship information. For example, the relative distance range between the biometric feature object and the recognition area is 1 cm to 3 cm. In this case, it can be determined that the distance at which the biometric feature object moves towards the recognition area is 1 cm (or 2 cm, 1.5 cm, etc.), and then the mechanical arm can be controlled to move the biometric feature object towards the recognition area based on the determined distance of 1 cm.

After the above processing, the processing in step C42 to step C46 can be repeated, until the biometric feature object is placed in the recognition area of the biometric recognition device.

Alternatively, specific processing of step S310 can be implemented by using the following method, which can specifically include processing in step D2 and D4.

Step D2: Control the mechanical arm to place the biometric feature object in the recognition area of the biometric recognition device, and control the mechanical arm to adjust a position and pose of the biometric feature object in the recognition area of the biometric recognition device.

The position and pose of the biometric feature object in the recognition area of the biometric recognition device can refer to a position, a placement pose, etc. The position can be geographical location coordinates, coordinates corresponding to a coordinate system that is established by using a certain point or surface as a starting point or a starting surface and set based on an actual situation, etc. The placement pose can be an inclined pose, a horizontal pose, an inverted pose, etc. The position and pose can be specifically set based on an actual situation. Implementations are not limited in the embodiments of the present specification.

In implementation, the main control child device can determine the recognition area of the biometric recognition device, and afterwards, can control the mechanical arm to place the biometric feature object in the recognition area of the biometric recognition device. In this case, the test device can control the mechanical arm to press the biometric feature object to trigger the biometric feature object to input the biometric feature in the feature attachment part into the biometric recognition device through the conductive part, to perform the biometric recognition attack test, and can record a test result. The main control child device can further control the mechanical arm to adjust the position and pose of the biometric feature object, so that the biometric feature object can be in a plurality of different positions and poses. The plurality of different positions and poses can be determined based on a plurality of different dimensions, for example, a two-dimensional position and pose, a three-dimensional position and pose, or a five-dimensional position and pose. The position and pose can be specifically set based on an actual situation. Implementations are not limited in the embodiments of the present specification.

Step D4: In each adjusted position and pose of the biometric feature object in the recognition area of the biometric recognition device, control the mechanical arm to press the biometric feature object to trigger the biometric feature object to input the biometric feature in the feature attachment part into the biometric recognition device through the conductive part, to perform the biometric recognition attack test.

Based on the above processing, the position and pose of the biometric feature object in the recognition area of the biometric recognition device can be automatically and dynamically adjusted. A test range can cover an entire trajectory range of the biometric feature object by performing a plurality of attack tests. A position of the biometric feature object in the recognition area of the biometric recognition device can be adjusted, so that a ratio of the test range to the trajectory range of the biometric feature object can be dynamically adjusted. For details, references can be made to the following related content: An area covered by the biometric feature object in the plurality of different positions and poses is greater than or equal to an area corresponding to the biometric recognition attack test.

Figure 4:
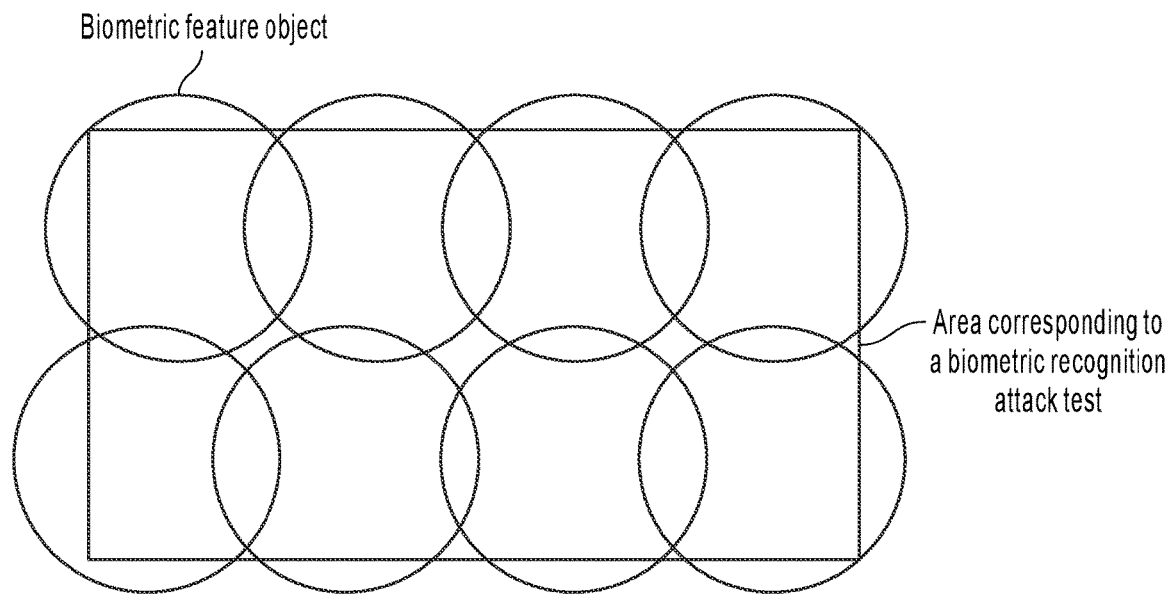
FIG. 4 is a schematic diagram illustrating a relationship between an area covered by a biometric feature object in a plurality of different positions and poses and an area corresponding to a biometric recognition attack test, according to the present specification.

As shown in FIG. 4, a plurality of circular areas are the trajectory range of the biometric feature object, and the test range is a range of a rectangular area. Clearly, the area covered by the biometric feature object in the plurality of different positions and poses is greater than or equal to the area corresponding to the biometric recognition attack test. As such, test accuracy and comprehensiveness can be improved.

In addition, if an attack test result corresponding to a first biometric feature object is an attack success, where the first biometric feature object is any biometric feature object, processing in step E2 to step E6 can be performed on the first biometric feature object.

Step E2: Obtain position information of the first biometric feature object in a biometric recognition attack test performed based on the first biometric feature object.

In implementation, the test device can control the camera component disposed on the mechanical arm to capture an image that includes the first biometric feature object in the biometric recognition attack test performed based on the first biometric feature object, and can analyze the image by using a predetermined image recognition algorithm to obtain the position information of the first biometric feature object in the biometric recognition attack test performed based on the first biometric feature object.

Step E4: Control, based on the position information of the first biometric feature object, the mechanical arm to repeat the biometric recognition attack test by using the first biometric feature object, and obtain an attack test result corresponding to the biometric recognition attack test repeated by using the first biometric feature object.

In implementation, a placement position of the first biometric feature object is determined based on the position information of the first biometric feature object (the placement position can be the same as a position corresponding to the position information of the first biometric feature object, or can be a position obtained by adjusting a position corresponding to the position information of the first biometric feature object by using a predetermined position adjustment method). Then, the mechanical arm can be controlled to re-place the biometric feature object in the recognition area of the biometric recognition device, and the mechanical arm is controlled to press the biometric feature object to trigger the biometric feature object to input the biometric feature in the feature attachment part into the biometric recognition device through the conductive part, to perform the biometric recognition attack test. In addition, the attack test result corresponding to the biometric recognition attack test repeated by using the first biometric feature object can be obtained.

Step E6: Use the obtained attack test result corresponding to the biometric recognition attack test repeated by using the first biometric feature object as the attack test result corresponding to the biometric feature object.

Step S312: Obtain the attack test result corresponding to the biometric feature object, and determine, based on the attack test result corresponding to the biometric feature object, a test result of the biometric recognition attack performed on the biometric recognition device.

It is worthwhile to note that when there are a plurality of biometric feature objects, the processing in step 302 to step 312 can be repeatedly performed for each biometric feature object. Finally, the test result of the biometric recognition attack performed on the biometric recognition device can be determined based on an attack test result corresponding to each biometric feature object.

The embodiments of the present specification provide the biometric recognition attack test method. The biometric feature object needed for performing the biometric recognition attack on the biometric recognition device is obtained, where the biometric feature object includes the feature attachment part to which biometric features are attached and the conductive part; and the mechanical arm is controlled to place the biometric feature object in the recognition area of the biometric recognition device. In this case, the biometric recognition attack test is performed on the biometric recognition device by using the mechanical arm, and therefore human resources are saved. In addition, various parameters (for example, a distance) of the mechanical arm are within a controllable range, thereby reducing an objective error in a manual test. In addition, the mechanical arm can be further controlled to press the biometric feature object to trigger the biometric feature object to input the biometric feature in the feature attachment part into the biometric recognition device through the conductive part, to perform the biometric recognition attack test; and the attack test result corresponding to the biometric feature object is obtained, and the test result of the biometric recognition attack performed on the biometric recognition device is determined based on the attack test result corresponding to the biometric feature object. In this case, the test is controlled by using the mechanical arm, and therefore test efficiency and test accuracy are improved.

In addition, a change between a plurality of poses and a plurality of positions and poses can be implemented by using the mechanical arm to implement an automatic biometric recognition test, so that a problem in the biometric recognition process can be easily reproduced and human resources in the test can be saved.

Embodiment 3

Figure 5:
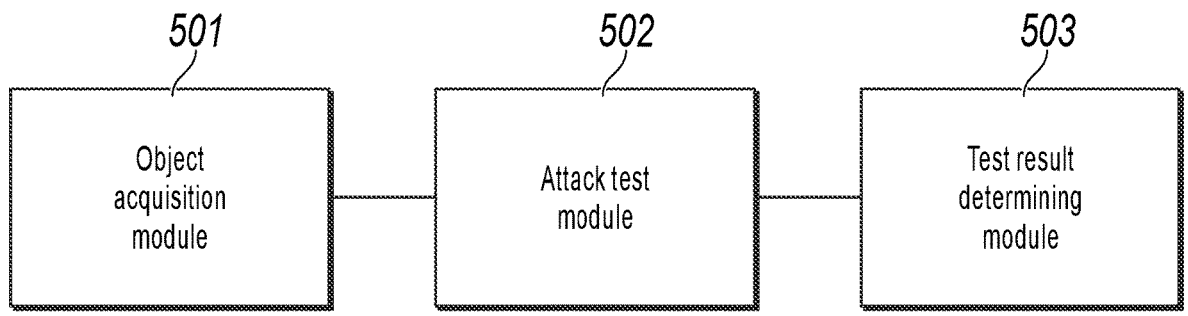
FIG. 5 is an embodiment illustrating a biometric recognition attack test apparatus, according to the present specification.

The biometric recognition attack test method provided in the embodiments of the present specification is described above. Based on the same idea, embodiments of the present specification further provide a biometric recognition attack test apparatus, as shown in FIG. 5.

The biometric recognition attack test apparatus includes an object acquisition module 501, an attack test module 502, and a test result determining module 503.

The object acquisition module 501 is configured to obtain a biometric feature object needed for performing a biometric recognition attack on a biometric recognition device. The biometric feature object includes a feature attachment part to which biometric features are attached and a conductive part.

The attack test module 502 is configured to control a mechanical arm to place the biometric feature object in a recognition area of the biometric recognition device, and control the mechanical arm to press the biometric feature object to trigger the biometric feature object to input the biometric feature in the feature attachment part into the biometric recognition device through the conductive part, to perform a biometric recognition attack test.

The test result determining module 503 is configured to obtain an attack test result corresponding to the biometric feature object, and determine, based on the attack test result corresponding to the biometric feature object, a test result of the biometric recognition attack performed on the biometric recognition device.

In the embodiments of the present specification, the apparatus further includes:

an environmental information acquisition module, configured to obtain current environmental information, where the environmental information includes one or more of a temperature, humidity, and light intensity; and an environment adjustment module, configured to adjust the current environmental information based on predetermined reference environmental information, to obtain environmental information for performing the biometric recognition attack test on the biometric recognition device; and the attack test module 502 is configured to: in an environment corresponding to the environmental information for performing the biometric recognition attack test on the biometric recognition device, control the mechanical arm to place the biometric feature object in the recognition area of the biometric recognition device, and control the mechanical arm to press the biometric feature object to trigger the biometric feature object to input the biometric feature in the feature attachment part into the biometric recognition device through the conductive part, to perform the biometric recognition attack test.

In the embodiments of the present specification, the attack test module 502 includes:

a position and pose adjustment unit, configured to control the mechanical arm to place the biometric feature object in the recognition area of the biometric recognition device, and control the mechanical arm to adjust a position and pose of the biometric feature object in the recognition area of the biometric recognition device; and a first attack test unit, configured to: in each adjusted position and pose of the biometric feature object in the recognition area of the biometric recognition device, control the mechanical arm to press the biometric feature object to trigger the biometric feature object to input the biometric feature in the feature attachment part into the biometric recognition device through the conductive part, to perform the biometric recognition attack test.

In the embodiments of the present specification, the attack test module 502 is configured to control the mechanical arm to press the biometric feature object based on a predetermined pressure parameter. The pressure parameter includes a pressure force parameter and a pressure angle parameter used by the mechanical arm to press the biometric feature object.

In the embodiments of the present specification, the attack test module 502 includes:

an image acquisition unit, configured to obtain a first image that includes the recognition area of the biometric recognition device and a second image that includes the biometric feature object through a camera component disposed on the mechanical arm;

a first position determining unit, configured to separately determine position information of the recognition area relative to a predetermined reference position and position information of the biometric feature object relative to the predetermined reference position based on the obtained first image, the obtained second image, and a predetermined image recognition algorithm; and a first control unit, configured to control the mechanical arm to place the biometric feature object in the recognition area of the biometric recognition device based on the position information of the recognition area relative to the predetermined reference position and the position information of the biometric feature object relative to the predetermined reference position.

In the embodiments of the present specification, the biometric feature object further includes a positioning part, and the attack test module 502 includes:

a signal sending unit, configured to send a positioning signal to each of the positioning part of the biometric feature object and the biometric recognition device;

a response receiving unit, configured to receive a response signal, corresponding to the positioning signal, returned by each of the positioning part of the biometric feature object and the biometric recognition device;

a second position determining unit, configured to separately determine position information of the recognition area relative to a predetermined reference position and position information of the biometric feature object relative to the predetermined reference position based on related information corresponding to the positioning signal and the response signal; and a second control unit, configured to control the mechanical arm to place the biometric feature object in the recognition area of the biometric recognition device based on the position information of the recognition area relative to the predetermined reference position and the position information of the biometric feature object relative to the predetermined reference position.

In the embodiments of the present specification, the attack test module 502 includes:

a third control unit, configured to control the mechanical arm to place the biometric feature object in a preselected area, where the preselected area is an area that includes or is adjacent to the recognition area of the biometric recognition device; and a second attack test unit, configured to control the mechanical arm to place the biometric feature object in the recognition area of the biometric recognition device by moving the biometric feature object towards the recognition area at least once based on a camera component disposed on the mechanical arm and a predetermined image recognition algorithm.

In the embodiments of the present specification, the second attack test unit is configured to obtain an image that includes the biometric feature object and the recognition area through the camera component disposed on the mechanical arm; determine positional relationship information between the biometric feature object and the recognition area by using the predetermined image recognition algorithm based on the obtained image that includes the biometric feature object and the recognition area; and determine, based on the determined positional relationship information, a distance at which the biometric feature object moves towards the recognition area, and control the mechanical arm to move the biometric feature object towards the recognition area based on the determined distance.

In the embodiments of the present specification, the object acquisition module 501 includes:

an identifier acquisition unit, configured to obtain an identifier of the biometric feature object needed for performing the biometric recognition attack on the biometric recognition device, where the identifier is set based on a graphic code; and an object acquisition unit, configured to control the mechanical arm to obtain a biometric feature object corresponding to the identifier from a feature object library based on the identifier by scanning the graphic code through the camera component disposed on the mechanical arm, and using the obtained biometric feature object as the biometric feature object needed for performing the biometric recognition attack on the biometric recognition device.

In the embodiments of the present specification, if an attack test result corresponding to a first biometric feature object is an attack success, where the first biometric feature object is any biometric feature object, the apparatus further includes:

a component position acquisition module, configured to obtain position information of the first biometric feature object in a biometric recognition attack test performed based on the first biometric feature object;

a test repeat module, configured to control, based on the position information of the first biometric feature object, the mechanical arm to repeat the biometric recognition attack test by using the first biometric feature object, and obtain an attack test result corresponding to the biometric recognition attack test repeated by using the first biometric feature object; and A result determining module, configured to use the obtained attack test result corresponding to the biometric recognition attack test repeated by using the first biometric feature object as the attack test result corresponding to the biometric feature object.

In the embodiments of the present specification, the biometric feature includes at least a fingerprint and a palmprint.

The embodiments of the present specification provide the biometric recognition attack test apparatus. The biometric feature object needed for performing the biometric recognition attack on the biometric recognition device is obtained, where the biometric feature object includes the feature attachment part to which biometric features are attached and the conductive part; and the mechanical arm is controlled to place the biometric feature object in the recognition area of the biometric recognition device. In this case, the biometric recognition attack test is performed on the biometric recognition device by using the mechanical arm, and therefore human resources are saved. In addition, various parameters (for example, a distance) of the mechanical arm are within a controllable range, thereby reducing an objective error in a manual test. In addition, the mechanical arm can be further controlled to press the biometric feature object to trigger the biometric feature object to input the biometric feature in the feature attachment part into the biometric recognition device through the conductive part, to perform the biometric recognition attack test; and the attack test result corresponding to the biometric feature object is obtained, and the test result of the biometric recognition attack performed on the biometric recognition device is determined based on the attack test result corresponding to the biometric feature object. In this case, the test is controlled by using the mechanical arm, and therefore test efficiency and test accuracy are improved.

In addition, a change between a plurality of poses and a plurality of positions and poses can be implemented by using the mechanical arm to implement an automatic biometric recognition test, so that a problem in the biometric recognition process can be easily reproduced and human resources in the test can be saved.

Embodiment 4

Figure 6:
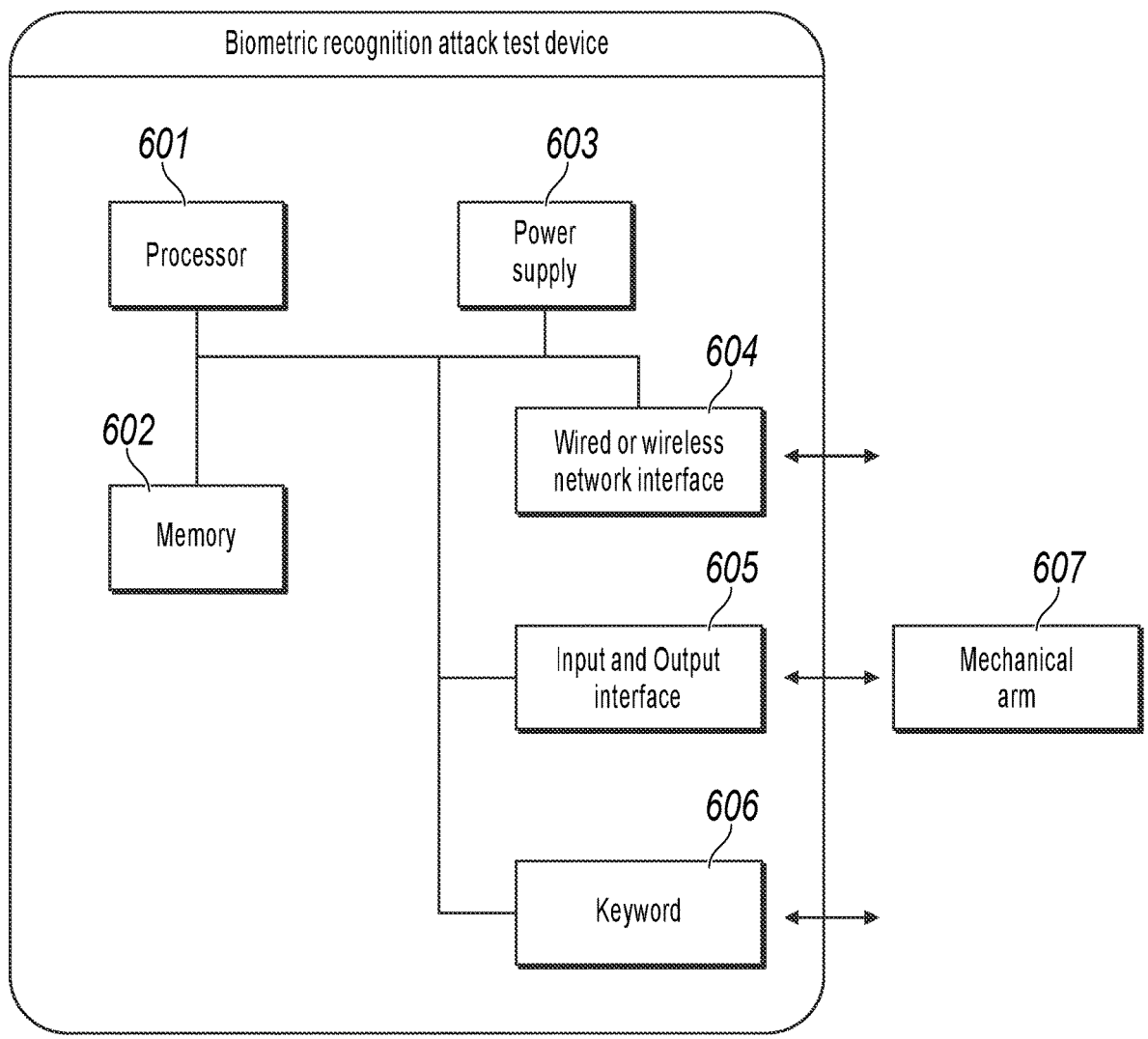
FIG. 6 is an embodiment illustrating a biometric recognition attack test device, according to the present specification.

The biometric recognition attack test apparatus provided in the embodiments of the present specification is described above. Based on the same idea, the embodiments of the present specification further provide a biometric recognition attack test device, as shown in FIG. 6.

The biometric recognition attack test device can be the biometric recognition test device provided in the above embodiments. The test device can include a main control child device, a mechanical arm, etc. The main control child device can be a terminal device or a server. The server can be an independent server or a server cluster that includes a plurality of servers. The server can be a back-end server of a financial service, an online shopping service, etc., or can be a back-end server of a certain application program, etc. The terminal device can be a mobile terminal device such as a mobile phone or a tablet computer, or can be a device such as a personal computer.

The biometric recognition attack test device can vary with configuration or performance, and can include one or more processors 601 and a memory 602. The memory 602 can store one or more memory application programs or data. The memory 602 can be transient or persistent storage. The application program stored in the memory 602 can include one or more modules (not shown in the figure). Each module can include a series of computer-executable instructions for the biometric recognition attack test device. Further, the processor 601 can be configured to communicate with the memory 602 to execute the series of computer-executable instructions in the memory 602 on the biometric recognition attack test device. The biometric recognition attack test device can further include one or more power supplies 603, one or more wired or wireless network interfaces 604, one or more input/output interfaces 605, one or more keyboards 606, and a mechanical arm 606.

Specifically, in the embodiments, the biometric recognition attack test device includes a memory and one or more programs. The one or more programs are stored in the memory. The one or more programs can include one or more modules, and each module can include a series of computer-executable instructions for the biometric recognition attack test device. One or more processors are configured to execute the one or more programs including for use in the following computer-executable instructions:

obtaining a biometric feature object needed for performing a biometric recognition attack on a biometric recognition device, where the biometric feature object includes a feature attachment part to which biometric features are attached and a conductive part;

controlling a mechanical arm to place the biometric feature object in a recognition area of the biometric recognition device, and controlling the mechanical arm to press the biometric feature object to trigger the biometric feature object to input the biometric feature in the feature attachment part into the biometric recognition device through the conductive part, to perform a biometric recognition attack test; and obtaining an attack test result corresponding to the biometric feature object, and determining, based on the attack test result corresponding to the biometric feature object, a test result of the biometric recognition attack performed on the biometric recognition device.

In the embodiments of the present specification, the following operations are further included:

obtaining current environmental information, where the environmental information includes one or more of a temperature, humidity, and light intensity; and adjusting the current environmental information based on predetermined reference environmental information, to obtain environmental information for performing the biometric recognition attack test on the biometric recognition device; and the controlling a mechanical arm to place the biometric feature object in a recognition area of the biometric recognition device, and controlling the mechanical arm to press the biometric feature object to trigger the biometric feature object to input the biometric feature in the feature attachment part into the biometric recognition device through the conductive part, to perform a biometric recognition attack test includes:

in an environment corresponding to the environmental information for performing the biometric recognition attack test on the biometric recognition device, controlling the mechanical arm to place the biometric feature object in the recognition area of the biometric recognition device, and controlling the mechanical arm to press the biometric feature object to trigger the biometric feature object to input the biometric feature in the feature attachment part into the biometric recognition device through the conductive part, to perform the biometric recognition attack test.

In the embodiments of the present specification, the controlling a mechanical arm to place the biometric feature object in a recognition area of the biometric recognition device, and controlling the mechanical arm to press the biometric feature object to trigger the biometric feature object to input the biometric feature in the feature attachment part into the biometric recognition device through the conductive part, to perform a biometric recognition attack test includes:

controlling the mechanical arm to place the biometric feature object in the recognition area of the biometric recognition device, and controlling the mechanical arm to adjust a position and pose of the biometric feature object in the recognition area of the biometric recognition device; and in each adjusted position and pose of the biometric feature object in the recognition area of the biometric recognition device, controlling the mechanical arm to press the biometric feature object to trigger the biometric feature object to input the biometric feature in the feature attachment part into the biometric recognition device through the conductive part, to perform the biometric recognition attack test.

In the embodiments of the present specification, the controlling the mechanical arm to press the biometric feature object includes:

controlling the mechanical arm to press the biometric feature object based on a predetermined pressure parameter, where the pressure parameter includes a pressure force parameter and a pressure angle parameter used by the mechanical arm to press the biometric feature object.

In the embodiments of the present specification, the controlling the mechanical arm to place the biometric feature object in the recognition area of the biometric recognition device includes:

obtaining a first image that includes the recognition area of the biometric recognition device and a second image that includes the biometric feature object through a camera component disposed on the mechanical arm;

separately determining position information of the recognition area relative to a predetermined reference position and position information of the biometric feature object relative to the predetermined reference position based on the obtained first image, the obtained second image, and a predetermined image recognition algorithm; and controlling the mechanical arm to place the biometric feature object in the recognition area of the biometric recognition device based on the position information of the recognition area relative to the predetermined reference position and the position information of the biometric feature object relative to the predetermined reference position.

In the embodiments of the present specification, the biometric feature object further includes a positioning part, and the controlling the mechanical arm to place the biometric feature object in the recognition area of the biometric recognition device includes:

sending a positioning signal to each of the positioning part of the biometric feature object and the biometric recognition device;

receiving a response signal, corresponding to the positioning signal, returned by each of the positioning part of the biometric feature object and the biometric recognition device;

separately determining position information of the recognition area relative to a predetermined reference position and position information of the biometric feature object relative to the predetermined reference position based on related information corresponding to the positioning signal and the response signal; and controlling the mechanical arm to place the biometric feature object in the recognition area of the biometric recognition device based on the position information of the recognition area relative to the predetermined reference position and the position information of the biometric feature object relative to the predetermined reference position.

In the embodiments of the present specification, the controlling the mechanical arm to place the biometric feature object in the recognition area of the biometric recognition device includes:

controlling the mechanical arm to place the biometric feature object in a preselected area, where the preselected area is an area that includes or is adjacent to the recognition area of the biometric recognition device; and controlling the mechanical arm to place the biometric feature object in the recognition area of the biometric recognition device by moving the biometric feature object towards the recognition area at least once based on a camera component disposed on the mechanical arm and a predetermined image recognition algorithm.

In the embodiments of the present specification, the controlling the mechanical arm to move the biometric feature object towards the recognition area at least once based on a camera component disposed on the mechanical arm and a predetermined image recognition algorithm includes:

obtaining an image that includes the biometric feature object and the recognition area through the camera component;

determining positional relationship information between the biometric feature object and the recognition area by using the predetermined image recognition algorithm based on the obtained image that includes the biometric feature object and the recognition area; and determining, based on the determined positional relationship information, a distance at which the biometric feature object moves towards the recognition area, and controlling the mechanical arm to move the biometric feature object towards the recognition area based on the determined distance.

In the embodiments of the present specification, the obtaining a biometric feature object needed for performing a biometric recognition attack on a biometric recognition device includes:

obtaining an identifier of the biometric feature object needed for performing the biometric recognition attack on the biometric recognition device, where the identifier is set based on a graphic code; and controlling the mechanical arm to obtain a biometric feature object corresponding to the identifier from a feature object library based on the identifier by scanning the graphic code through the camera component disposed on the mechanical arm, and using the obtained biometric feature object as the biometric feature object needed for performing the biometric recognition attack on the biometric recognition device.

In the embodiments of the present specification, if an attack test result corresponding to a first biometric feature object is an attack success, where the first biometric feature object is any biometric feature object, the following operations are further included:

obtaining position information of the first biometric feature object in a biometric recognition attack test performed based on the first biometric feature object;

controlling, based on the position information of the first biometric feature object, the mechanical arm to repeat the biometric recognition attack test by using the first biometric feature object, and obtaining an attack test result corresponding to the biometric recognition attack test repeated by using the first biometric feature object; and using the obtained attack test result corresponding to the biometric recognition attack test repeated by using the first biometric feature object as the attack test result corresponding to the biometric feature object.

In the embodiments of the present specification, the biometric feature includes at least a fingerprint and a palmprint.

The embodiments of the present specification provide the biometric recognition attack test device. The biometric feature object needed for performing the biometric recognition attack on the biometric recognition device is obtained, where the biometric feature object includes the feature attachment part to which biometric features are attached and the conductive part; and the mechanical arm is controlled to place the biometric feature object in the recognition area of the biometric recognition device. In this case, the biometric recognition attack test is performed on the biometric recognition device by using the mechanical arm, and therefore human resources are saved. In addition, various parameters (for example, a distance) of the mechanical arm are within a controllable range, thereby reducing an objective error in a manual test. In addition, the mechanical arm can be further controlled to press the biometric feature object to trigger the biometric feature object to input the biometric feature in the feature attachment part into the biometric recognition device through the conductive part, to perform the biometric recognition attack test; and the attack test result corresponding to the biometric feature object is obtained, and the test result of the biometric recognition attack performed on the biometric recognition device is determined based on the attack test result corresponding to the biometric feature object. In this case, the test is controlled by using the mechanical arm, and therefore test efficiency and test accuracy are improved.

In addition, a change between a plurality of poses and a plurality of positions and poses can be implemented by using the mechanical arm to implement an automatic biometric recognition test, so that a problem in the biometric recognition process can be easily reproduced and human resources in the test can be saved.

Embodiment 5

Further, based on the methods shown in FIG. 1 to FIG. 4, one or more embodiments of the present specification further provide a storage medium configured to store computer-executable instruction information. In a specific embodiment, the storage medium can be a USB flash drive, an optical disc, a hard disk, etc. When the computer-executable instruction information stored in the storage medium is executed by a processor, the following procedures can be implemented:

obtaining a biometric feature object needed for performing a biometric recognition attack on a biometric recognition device, where the biometric feature object includes a feature attachment part to which biometric features are attached and a conductive part;

controlling a mechanical arm to place the biometric feature object in a recognition area of the biometric recognition device, and controlling the mechanical arm to press the biometric feature object to trigger the biometric feature object to input the biometric feature in the feature attachment part into the biometric recognition device through the conductive part, to perform a biometric recognition attack test; and obtaining an attack test result corresponding to the biometric feature object, and determining, based on the attack test result corresponding to the biometric feature object, a test result of the biometric recognition attack performed on the biometric recognition device.

In the embodiments of the present specification, the following operations are further included:

obtaining current environmental information, where the environmental information includes one or more of a temperature, humidity, and light intensity; and adjusting the current environmental information based on predetermined reference environmental information, to obtain environmental information for performing the biometric recognition attack test on the biometric recognition device; and the controlling a mechanical arm to place the biometric feature object in a recognition area of the biometric recognition device, and controlling the mechanical arm to press the biometric feature object to trigger the biometric feature object to input the biometric feature in the feature attachment part into the biometric recognition device through the conductive part, to perform a biometric recognition attack test includes:

in an environment corresponding to the environmental information for performing the biometric recognition attack test on the biometric recognition device, controlling the mechanical arm to place the biometric feature object in the recognition area of the biometric recognition device, and controlling the mechanical arm to press the biometric feature object to trigger the biometric feature object to input the biometric feature in the feature attachment part into the biometric recognition device through the conductive part, to perform the biometric recognition attack test.

In the embodiments of the present specification, the controlling a mechanical arm to place the biometric feature object in a recognition area of the biometric recognition device, and controlling the mechanical arm to press the biometric feature object to trigger the biometric feature object to input the biometric feature in the feature attachment part into the biometric recognition device through the conductive part, to perform a biometric recognition attack test includes:

controlling the mechanical arm to place the biometric feature object in the recognition area of the biometric recognition device, and controlling the mechanical arm to adjust a position and pose of the biometric feature object in the recognition area of the biometric recognition device; and in each adjusted position and pose of the biometric feature object in the recognition area of the biometric recognition device, controlling the mechanical arm to press the biometric feature object to trigger the biometric feature object to input the biometric feature in the feature attachment part into the biometric recognition device through the conductive part, to perform the biometric recognition attack test.

In the embodiments of the present specification, the controlling the mechanical arm to press the biometric feature object includes:

controlling the mechanical arm to press the biometric feature object based on a predetermined pressure parameter, where the pressure parameter includes a pressure force parameter and a pressure angle parameter used by the mechanical arm to press the biometric feature object.

In the embodiments of the present specification, the controlling the mechanical arm to place the biometric feature object in the recognition area of the biometric recognition device includes:

obtaining a first image that includes the recognition area of the biometric recognition device and a second image that includes the biometric feature object through a camera component disposed on the mechanical arm;

separately determining position information of the recognition area relative to a predetermined reference position and position information of the biometric feature object relative to the predetermined reference position based on the obtained first image, the obtained second image, and a predetermined image recognition algorithm; and controlling the mechanical arm to place the biometric feature object in the recognition area of the biometric recognition device based on the position information of the recognition area relative to the predetermined reference position and the position information of the biometric feature object relative to the predetermined reference position.

In the embodiments of the present specification, the biometric feature object further includes a positioning part, and the controlling the mechanical arm to place the biometric feature object in the recognition area of the biometric recognition device includes:

sending a positioning signal to each of the positioning part of the biometric feature object and the biometric recognition device;

receiving a response signal, corresponding to the positioning signal, returned by each of the positioning part of the biometric feature object and the biometric recognition device;

separately determining position information of the recognition area relative to a predetermined reference position and position information of the biometric feature object relative to the predetermined reference position based on related information corresponding to the positioning signal and the response signal; and controlling the mechanical arm to place the biometric feature object in the recognition area of the biometric recognition device based on the position information of the recognition area relative to the predetermined reference position and the position information of the biometric feature object relative to the predetermined reference position.

In the embodiments of the present specification, the controlling the mechanical arm to place the biometric feature object in the recognition area of the biometric recognition device includes:

controlling the mechanical arm to place the biometric feature object in a preselected area, where the preselected area is an area that includes or is adjacent to the recognition area of the biometric recognition device; and controlling the mechanical arm to place the biometric feature object in the recognition area of the biometric recognition device by moving the biometric feature object towards the recognition area at least once based on a camera component disposed on the mechanical arm and a predetermined image recognition algorithm.

In the embodiments of the present specification, the controlling the mechanical arm to move the biometric feature object towards the recognition area at least once based on a camera component disposed on the mechanical arm and a predetermined image recognition algorithm includes:

obtaining an image that includes the biometric feature object and the recognition area through the camera component;

determining positional relationship information between the biometric feature object and the recognition area by using the predetermined image recognition algorithm based on the obtained image that includes the biometric feature object and the recognition area; and determining, based on the determined positional relationship information, a distance at which the biometric feature object moves towards the recognition area, and controlling the mechanical arm to move the biometric feature object towards the recognition area based on the determined distance.

In the embodiments of the present specification, the obtaining a biometric feature object needed for performing a biometric recognition attack on a biometric recognition device includes:

obtaining an identifier of the biometric feature object needed for performing the biometric recognition attack on the biometric recognition device, where the identifier is set based on a graphic code; and controlling the mechanical arm to obtain a biometric feature object corresponding to the identifier from a feature object library based on the identifier by scanning the graphic code through the camera component disposed on the mechanical arm, and using the obtained biometric feature object as the biometric feature object needed for performing the biometric recognition attack on the biometric recognition device.

In the embodiments of the present specification, if an attack test result corresponding to a first biometric feature object is an attack success, where the first biometric feature object is any biometric feature object, the following operations are further included:

obtaining position information of the first biometric feature object in a biometric recognition attack test performed based on the first biometric feature object;

controlling, based on the position information of the first biometric feature object, the mechanical arm to repeat the biometric recognition attack test by using the first biometric feature object, and obtaining an attack test result corresponding to the biometric recognition attack test repeated by using the first biometric feature object; and using the obtained attack test result corresponding to the biometric recognition attack test repeated by using the first biometric feature object as the attack test result corresponding to the biometric feature object.

In the embodiments of the present specification, the biometric feature includes at least a fingerprint and a palmprint.

The embodiments of the present specification provide the storage medium. The biometric feature object needed for performing the biometric recognition attack on the biometric recognition device is obtained, where the biometric feature object includes the feature attachment part to which biometric features are attached and the conductive part; and the mechanical arm is controlled to place the biometric feature object in the recognition area of the biometric recognition device. In this case, the biometric recognition attack test is performed on the biometric recognition device by using the mechanical arm, and therefore human resources are saved. In addition, various parameters (for example, a distance) of the mechanical arm are within a controllable range, thereby reducing an objective error in a manual test. In addition, the mechanical arm can be further controlled to press the biometric feature object to trigger the biometric feature object to input the biometric feature in the feature attachment part into the biometric recognition device through the conductive part, to perform the biometric recognition attack test; and the attack test result corresponding to the biometric feature object is obtained, and the test result of the biometric recognition attack performed on the biometric recognition device is determined based on the attack test result corresponding to the biometric feature object. In this case, the test is controlled by using the mechanical arm, and therefore test efficiency and test accuracy are improved.

In addition, a change between a plurality of poses and a plurality of positions and poses can be implemented by using the mechanical arm to implement an automatic biometric recognition test, so that a problem in the biometric recognition process can be easily reproduced and human resources in the test can be saved.

Specific embodiments of the present specification are described above. Other embodiments fall within the scope of the appended claims. In some cases, the actions or steps described in the claims can be performed in a sequence different from that in the embodiments, and the desired results can still be achieved. In addition, the process described in the accompanying drawings does not necessarily require a particular sequence or sequential sequence shown to achieve the desired results. In some implementations, multi-tasking and parallel processing can be advantageous.

In the 1990s, whether a technical improvement is a hardware improvement (for example, an improvement of a circuit structure, such as a diode, a transistor, or a switch) or a software improvement (an improvement of a method procedure) can be clearly distinguished. However, as technologies develop, current improvements of many method procedures can be considered as direct improvements of hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, a computer-readable medium that stores computer readable program code (such as software or firmware) that can be executed by a microprocessor or a processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of a logic gate, a switch, an application-specific integrated circuit, a programmable logic controller, and a built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previously described embodiments can be specifically implemented by a computer chip or an entity, or can be implemented by a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when one or more embodiments of the present specification are implemented, function of units can be implemented in one or more pieces of software and/or hardware.

A person skilled in the art should understand that the embodiments of the present specification can be provided as methods, systems, or computer program products. Therefore, one or more embodiments of the present specification can use a form of hardware only embodiments, software only embodiments, or embodiments with a combination of software and hardware. In addition, one or more embodiments of the present specification can use a form of a computer program product that is implemented on one or more computer-usable storage media (including but not limited to a disk memory, a CD-ROM, an optical memory, etc.) that include computer-usable program code.

The embodiments of the present specification are described with reference to the flowcharts and/or block diagrams of the method, the device (system), and the computer program product based on the embodiments of the present specification. It should be understood that computer program instructions can be used to implement each process and/or each block in the flowcharts and/or the block diagrams and a combination of processes and/or blocks in the flowcharts and/or the block diagrams. These computer program instructions can be provided for a general-purpose computer, a dedicated computer, an embedded processor, or a processor of another programmable biometric recognition attack test device to generate a machine, so that the instructions executed by the computer or the processor of the another programmable biometric recognition attack test device generate an apparatus for implementing a specific function in one or more processes in the flowcharts and/or in one or more blocks in the block diagrams.

These computer program instructions can be stored in a computer readable memory that can instruct a computer or another programmable biometric recognition attack test device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable biometric recognition attack test device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer-readable medium includes persistent, non-persistent, removable, and irremovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, magnetic tape/magnetic disk storage or another magnetic storage device, or any other non-transmission medium. The computer storage medium can be used to store information accessible by a computing device. Based on the definition in the present specification, the computer-readable medium does not include transitory computer readable media (transitory media) such as a modulated data signal and carrier.

It is worthwhile to further note that the terms "include", "comprise", and their any other variants are intended to cover a nonexclusive inclusion, so that a process, a method, a product, or a device that includes a series of elements not only includes these elements, but also includes other elements which are not expressly listed, or further includes elements inherent to such process, method, product, or device. An element described by "includes a . . . " further includes, without more constraints, another same or identical element in the process, method, product, or device that includes the element.

A person skilled in the art should understand that the embodiments of the present specification can be provided as methods, systems, or computer program products. Therefore, one or more embodiments of the present specification can use a form of hardware only embodiments, software only embodiments, or embodiments with a combination of software and hardware. In addition, one or more embodiments of the present specification can use a form of a computer program product that is implemented on one or more computer-usable storage media (including but not limited to a disk memory, a CD-ROM, an optical memory, etc.) that include computer-usable program code.

One or more embodiments of the present specification can be described in the general context of computer-executable instructions executed by a computer, for example, a program module. The program module usually includes a routine, a program, an object, a component, a data structure, etc. for executing a specific task or implementing a specific abstract data type. One or more embodiments of the present specification can be practiced in distributed computing environments. In the distributed computing environments, tasks are performed by remote processing devices that are connected through a communications network. In the distributed computing environment, the program module can be located in both local and remote computer storage media including storage devices.

The embodiments of the present specification are described in a progressive way. For same or similar parts in the embodiments, references can be made to these embodiments, and each embodiment focuses on a difference from other embodiments. Particularly, the system embodiment is basically similar to the method embodiments, and therefore is described briefly. For related parts, references can be made to partial description in the method embodiments.

The previous descriptions are merely embodiments of the present specification, and are not intended to limit the present specification. For a person skilled in the art, the present specification can have various modifications and changes. Any modifications, equivalent replacements, and improvements made within the spirit and the principle of the present specification shall fall within the scope of the claims in the present specification.

What is claimed is:

1. A computer-implemented method for performing a biometric recognition attack test on a biometric recognition device, wherein the method comprises:
    obtaining a biometric feature object for performing the biometric recognition attack on the biometric recognition device, wherein the biometric feature object comprises a feature attachment part to which biometric features are attached and a conductive part that is electrically conductive;
    perform the biometric recognition attack test on the biometric recognition device, comprising:
        controlling a mechanical arm to place the biometric feature object in a recognition area of the biometric recognition device; and
        controlling the mechanical arm to press the biometric feature object to the biometric recognition device to trigger the biometric feature object to input the biometric features in the feature attachment part into the biometric recognition device through the conductive part;

obtaining an attack test result corresponding to the biometric feature object; and determining, based on the attack test result corresponding to the biometric feature object, a test result of the biometric recognition attack test performed on the biometric recognition device.

2. The computer-implemented method according to claim 1, further comprising:

obtaining test environmental information that comprises one or more of a temperature, humidity, or light intensity;

adjusting the test environmental information based on predetermined reference environmental information to obtain current test environmental information for performing the biometric recognition attack test on the biometric recognition device; and performing the biometric recognition attack test on the biometric recognition device in an environment configured to have the current test environmental information.

3. The computer-implemented method according to claim 1, wherein controlling the mechanical arm to place the biometric feature object in the recognition area of the biometric recognition device comprises:

controlling the mechanical arm to place the biometric feature object in a plurality of adjusted poses in the recognition area of the biometric recognition device; and wherein controlling the mechanical arm to press the biometric feature object to trigger the biometric feature object to input the biometric features in the feature attachment part into the biometric recognition device through the conductive part comprises:

controlling the mechanical arm to press the biometric feature object in each of the plurality of adjusted poses in the recognition area of the biometric recognition device.

4. The computer-implemented method according to claim 3, wherein controlling the mechanical arm to press the biometric feature object comprises:

controlling the mechanical arm to press the biometric feature object based on a predetermined pressure parameter, wherein the pressure parameter comprises a pressure force parameter and a pressure angle parameter used by the mechanical arm to press the biometric feature object.

5. The computer-implemented method according to claim 4, wherein controlling the mechanical arm to place the biometric feature object in the recognition area of the biometric recognition device comprises:

obtaining a first image that characterizes the recognition area of the biometric recognition device and a second image that characterizes the biometric feature object through a camera component disposed on the mechanical arm;

separately determining position information of the recognition area relative to a predetermined reference position and position information of the biometric feature object relative to the predetermined reference position based on the obtained first image, the second image, and a predetermined image recognition algorithm; and controlling the mechanical arm to place the biometric feature object in the recognition area of the biometric recognition device based on the position information of the recognition area relative to the predetermined reference position and the position information of the biometric feature object relative to the predetermined reference position.

6. The computer-implemented method according to claim 4, wherein the biometric feature object further comprises a positioning part, and controlling the mechanical arm to place the biometric feature object in the recognition area of the biometric recognition device comprises:

sending a respective positioning signal to the positioning part of the biometric feature object and to the biometric recognition device;

receiving a respective response signal returned by the positioning part of the biometric feature object and the biometric recognition device;

separately determining position information of the recognition area relative to a predetermined reference position and position information of the biometric feature object relative to the predetermined reference position based on related information corresponding to the positioning signal and the respective response signals; and controlling the mechanical arm to place the biometric feature object in the recognition area of the biometric recognition device based on the position information of the recognition area relative to the predetermined reference position and the position information of the biometric feature object relative to the predetermined reference position.

7. The computer-implemented method according to claim 5, wherein controlling the mechanical arm to place the biometric feature object in the recognition area of the biometric recognition device comprises:

controlling the mechanical arm to place the biometric feature object in a preselected area, wherein the preselected area is an area that includes or is adjacent to the recognition area of the biometric recognition device; and controlling the mechanical arm to place the biometric feature object in the recognition area of the biometric recognition device by moving the biometric feature object towards the recognition area at least once based on the camera component disposed on the mechanical arm and a predetermined image recognition algorithm.

8. The computer-implemented method according to claim 7, wherein controlling the mechanical arm to move the biometric feature object towards the recognition area at least once based on the camera component disposed on the mechanical arm and the predetermined image recognition algorithm comprises:

obtaining an image that characterizes the biometric feature object and the recognition area through the camera component;

determining positional relationship information between the biometric feature object and the recognition area by using the predetermined image recognition algorithm based on the images that characterize the biometric feature object and the recognition area;

determining, based on the determined positional relationship information, a distance at which the biometric feature object needs to move towards the recognition area; and controlling the mechanical arm to move the biometric feature object towards the recognition area based on the distance.

9. The computer-implemented method according to claim 1, wherein obtaining the biometric feature object for performing the biometric recognition attack test on the biometric recognition device comprises:
- obtaining an identifier of the biometric feature object for performing the biometric recognition attack on the biometric recognition device, wherein the identifier is set based on a graphic code; and
- controlling the mechanical arm to obtain the biometric feature object corresponding to the identifier from a feature object library storing multiple different biometric feature objects based on the identifier.

10. The computer-implemented method according to claim 1, further comprising, in response to determining that the attack test result corresponding to the biometric feature object is successful:
- obtaining position information of the biometric feature object in the biometric recognition attack test;
- controlling, based on the position information of the biometric feature object, the mechanical arm to repeat the biometric recognition attack test by using the biometric feature object; and
- obtaining a repeated attack test result corresponding to the biometric recognition attack test by using the biometric feature object.

11. The computer-implemented method according to claim 1, wherein the biometric feature comprises at least a fingerprint or a palmprint.

12. A non-transitory, computer-readable medium storing one or more instructions executable by a computer system to perform operations for performing a biometric recognition attack test on a biometric recognition device, wherein the operations comprise:
- obtaining a biometric feature object for performing the biometric recognition attack on the biometric recognition device, wherein the biometric feature object comprises a feature attachment part to which biometric features are attached and a conductive part that is electrically conductive;
- perform the biometric recognition attack test on the biometric recognition device, comprising:
  - controlling a mechanical arm to place the biometric feature object in a recognition area of the biometric recognition device; and
  - controlling the mechanical arm to press the biometric feature object to the biometric recognition device to trigger the biometric feature object to input the biometric features in the feature attachment part into the biometric recognition device through the conductive part;
- obtaining an attack test result corresponding to the biometric feature object; and
- determining, based on the attack test result corresponding to the biometric feature object, a test result of the biometric recognition attack test performed on the biometric recognition device.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations for performing a biometric recognition attack test on a biometric recognition device, wherein the operations comprise:
- obtaining a biometric feature object for performing the biometric recognition attack on the biometric recognition device, wherein the biometric feature object comprises a feature attachment part to which biometric features are attached and a conductive part that is electrically conductive;
- perform the biometric recognition attack test on the biometric recognition device, comprising:
  - controlling a mechanical arm to place the biometric feature object in a recognition area of the biometric recognition device; and
  - controlling the mechanical arm to press the biometric feature object to the biometric recognition device to trigger the biometric feature object to input the biometric features in the feature attachment part into the biometric recognition device through the conductive part;
- obtaining an attack test result corresponding to the biometric feature object; and
- determining, based on the attack test result corresponding to the biometric feature object, a test result of the biometric recognition attack test performed on the biometric recognition device.

14. The computer-implemented system according to claim 13, wherein the operations further comprise:
- obtaining test environmental information that comprises one or more of a temperature, humidity, or light intensity;
- adjusting the test environmental information based on predetermined reference environmental information to obtain current test environmental information for performing the biometric recognition attack test on the biometric recognition device; and
- performing the biometric recognition attack test on the biometric recognition device in an environment configured to have the current test environmental information.

15. The computer-implemented system according to claim 13, wherein controlling the mechanical arm to place the biometric feature object in the recognition area of the biometric recognition device comprises:
- controlling the mechanical arm to place the biometric feature object in a plurality of adjusted poses in the recognition area of the biometric recognition device; and
- wherein controlling the mechanical arm to press the biometric feature object to trigger the biometric feature object to input the biometric features in the feature attachment part into the biometric recognition device through the conductive part comprises:
- controlling the mechanical arm to press the biometric feature object in each of the plurality of adjusted poses in the recognition area of the biometric recognition device.

16. The computer-implemented system according to claim 15, wherein controlling the mechanical arm to press the biometric feature object comprises:
- controlling the mechanical arm to press the biometric feature object based on a predetermined pressure parameter, wherein the pressure parameter comprises a pressure force parameter and a pressure angle parameter used by the mechanical arm to press the biometric feature object.

17. The computer-implemented system according to claim 16, wherein controlling the mechanical arm to place the biometric feature object in the recognition area of the biometric recognition device comprises:
- obtaining a first image that characterizes the recognition area of the biometric recognition device and a second image that characterizes the biometric feature object through a camera component disposed on the mechanical arm;

separately determining position information of the recognition area relative to a predetermined reference position and position information of the biometric feature object relative to the predetermined reference position based on the obtained first image, the second image, and a predetermined image recognition algorithm; and controlling the mechanical arm to place the biometric feature object in the recognition area of the biometric recognition device based on the position information of the recognition area relative to the predetermined reference position and the position information of the biometric feature object relative to the predetermined reference position.

18. The computer-implemented system according to claim 16, wherein the biometric feature object further comprises a positioning part, and controlling the mechanical arm to place the biometric feature object in the recognition area of the biometric recognition device comprises:

sending a respective positioning signal to the positioning part of the biometric feature object and to the biometric recognition device;

receiving a respective response signal returned by the positioning part of the biometric feature object and the biometric recognition device;

separately determining position information of the recognition area relative to a predetermined reference position and position information of the biometric feature object relative to the predetermined reference position based on related information corresponding to the positioning signal and the respective response signals; and controlling the mechanical arm to place the biometric feature object in the recognition area of the biometric recognition device based on the position information of the recognition area relative to the predetermined reference position and the position information of the biometric feature object relative to the predetermined reference position.

19. The computer-implemented system according to claim 17, wherein controlling the mechanical arm to place the biometric feature object in the recognition area of the biometric recognition device comprises:

controlling the mechanical arm to place the biometric feature object in a preselected area, wherein the preselected area is an area that includes or is adjacent to the recognition area of the biometric recognition device; and controlling the mechanical arm to place the biometric feature object in the recognition area of the biometric recognition device by moving the biometric feature object towards the recognition area at least once based on the camera component disposed on the mechanical arm and a predetermined image recognition algorithm.

20. The computer-implemented system according to claim 19, wherein controlling the mechanical arm to move the biometric feature object towards the recognition area at least once based on the camera component disposed on the mechanical arm and the predetermined image recognition algorithm comprises:

obtaining an image that characterizes the biometric feature object and the recognition area through the camera component;

determining positional relationship information between the biometric feature object and the recognition area by using the predetermined image recognition algorithm based on the images that characterize the biometric feature object and the recognition area;

determining, based on the determined positional relationship information, a distance at which the biometric feature object needs to move towards the recognition area; and controlling the mechanical arm to move the biometric feature object towards the recognition area based on the distance.

* * * * *